(12) United States Patent
Lerner et al.

(10) Patent No.: US 8,424,460 B2
(45) Date of Patent: Apr. 23, 2013

(54) TROLLEY FOR DOWNHILL ZIP LINE THRILL RIDE

(76) Inventors: Shawn Geoffrey Lerner, New York City, NY (US); Michael Troy Richardson, Elkridge, UT (US)

( * ) Notice: Subject to any disclaimer, the term of this patent is extended or adjusted under 35 U.S.C. 154(b) by 233 days.

(21) Appl. No.: 12/980,315

(22) Filed: Dec. 28, 2010

(65) Prior Publication Data

US 2012/0160122 A1 Jun. 28, 2012

(51) Int. Cl.
*B61B 7/00* (2006.01)
(52) U.S. Cl.
USPC .......................................................... 104/113
(58) Field of Classification Search .................... 104/89, 104/90, 112–116, 173.1–174
See application file for complete search history.

(56) References Cited

U.S. PATENT DOCUMENTS 4,934,277 A * 6/1990 Smith et al. ................... 104/113

* cited by examiner

*Primary Examiner* — R. J. McCarry, Jr.
(74) *Attorney, Agent, or Firm* — Angus C. Fox, III

(57) ABSTRACT

A zip line trolley includes a frame assembled from a pair of spaced-apart parallel side plates and an inner beam, which is partially sandwiched between the side plates. The inner beam has a gallery of block-T-shaped cross section which extends its length. A shackle, from which a rider is suspended, can be pinned anywhere within the gallery. A main pulley, which is installed in an upper middle portion of the frame, rotates on a pair of sealed ball bearing races that are pressed on a hollow keyed shaft which slides into opposed grooves machined into each of the side plates. The keyed shaft is bolted between the side plates with a shoulder bolt passing transversely through both side plates. A water-wiping brake pad is pivotally mounted within the frame in front of the main pulley. A bumper is bolted between front portions of the side plates.

20 Claims, 21 Drawing Sheets

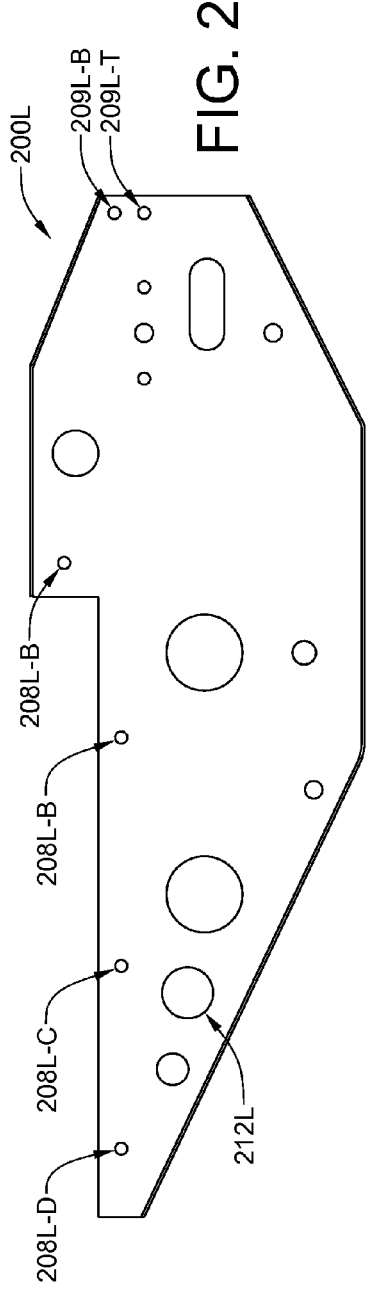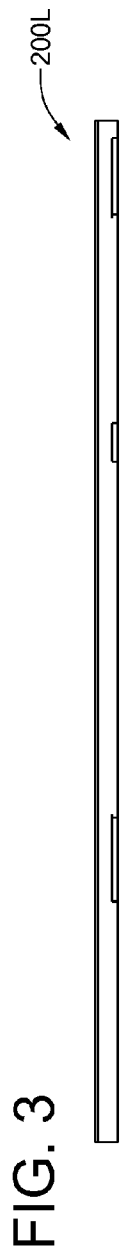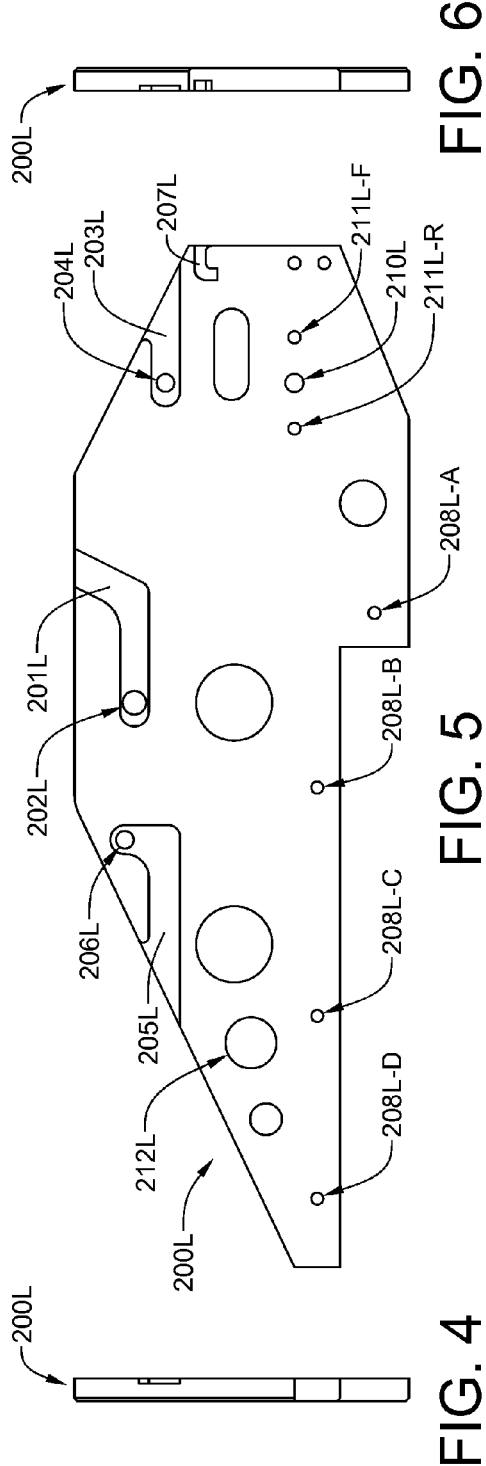

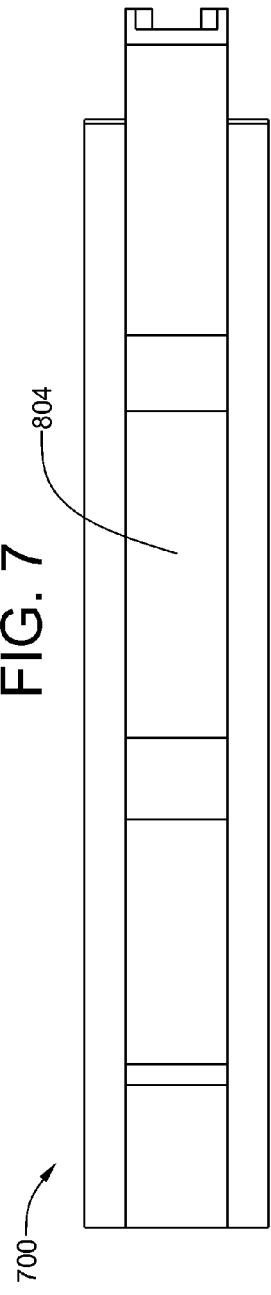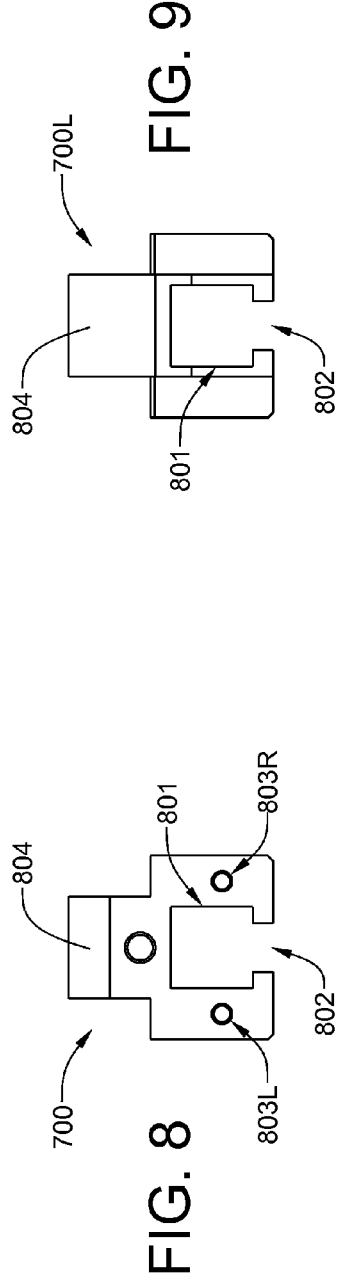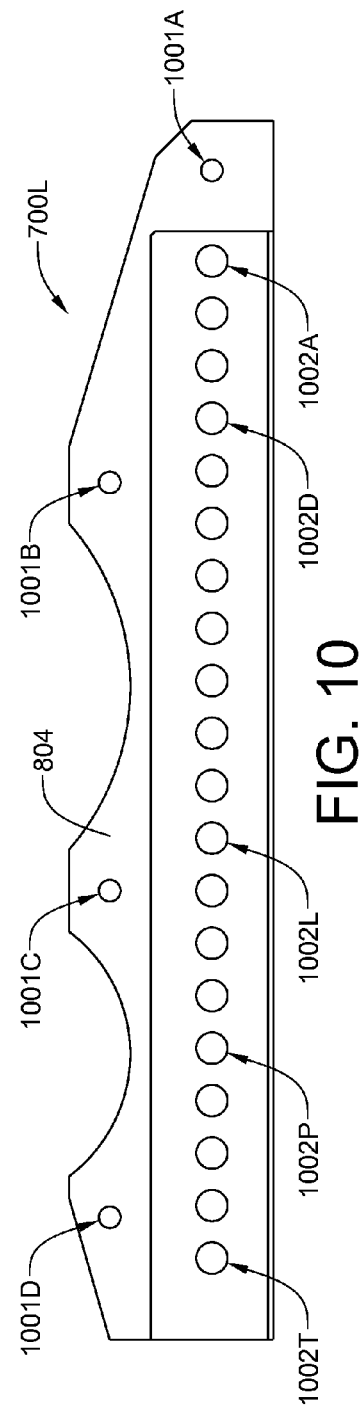

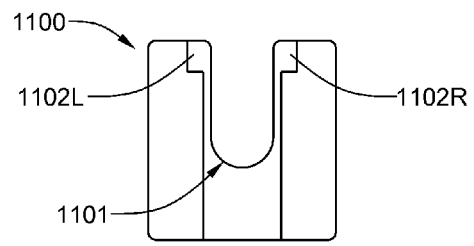
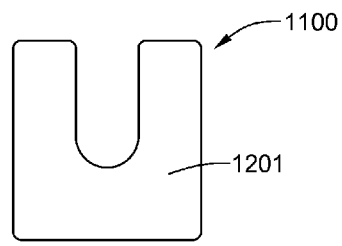
FIG. 11  FIG. 12
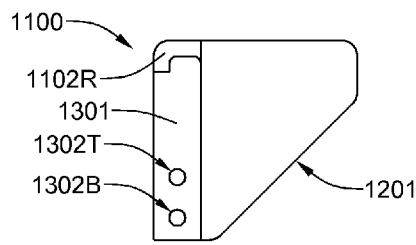
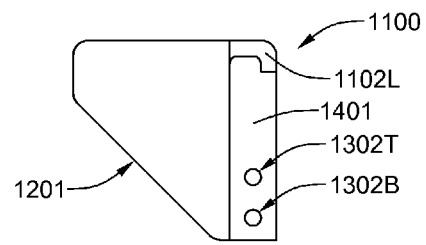
FIG. 13  FIG. 14
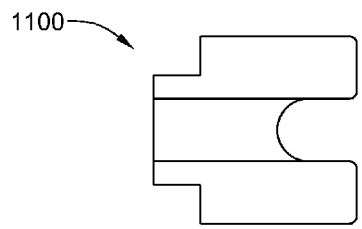
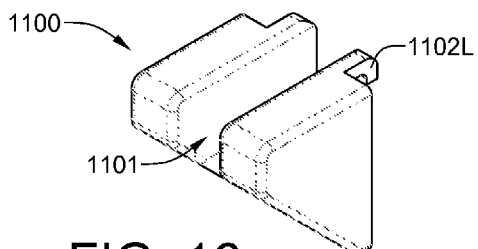
FIG. 15  FIG. 16
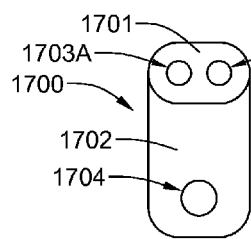
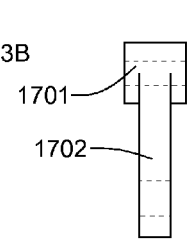
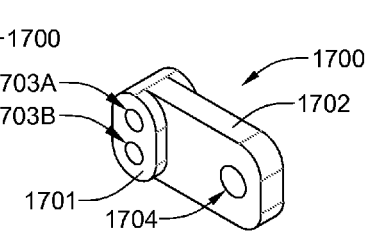
FIG. 17  FIG. 18  FIG. 19

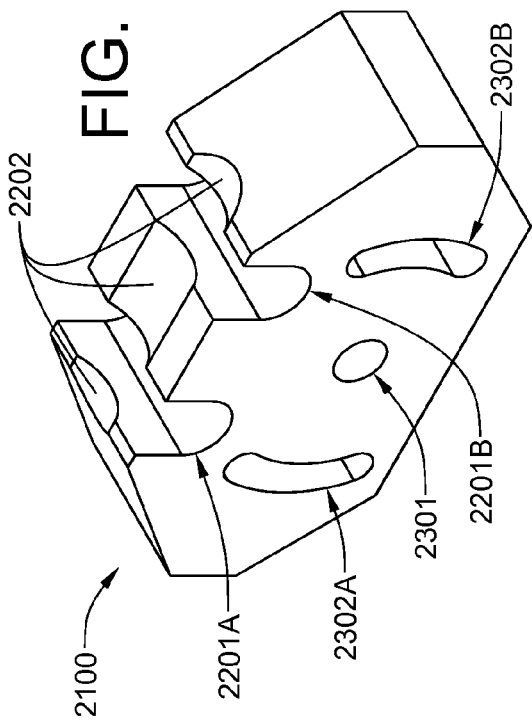
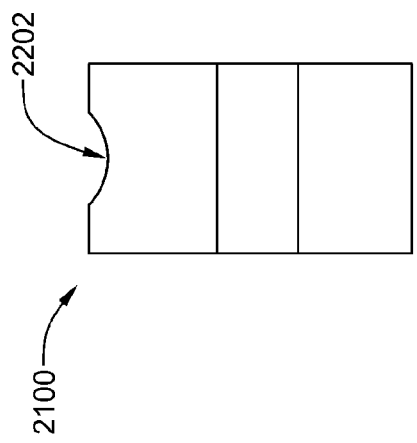
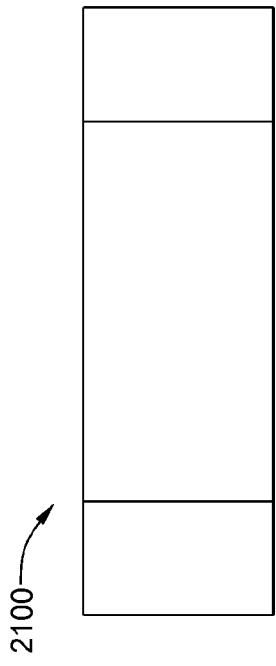
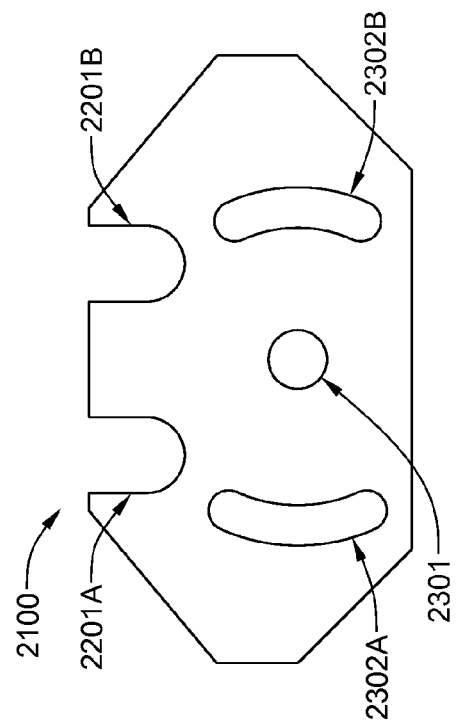

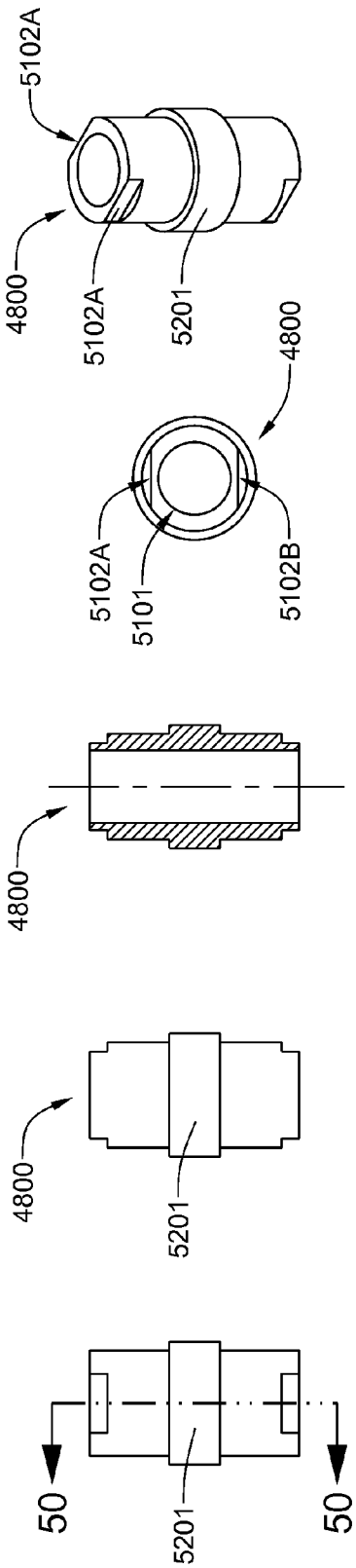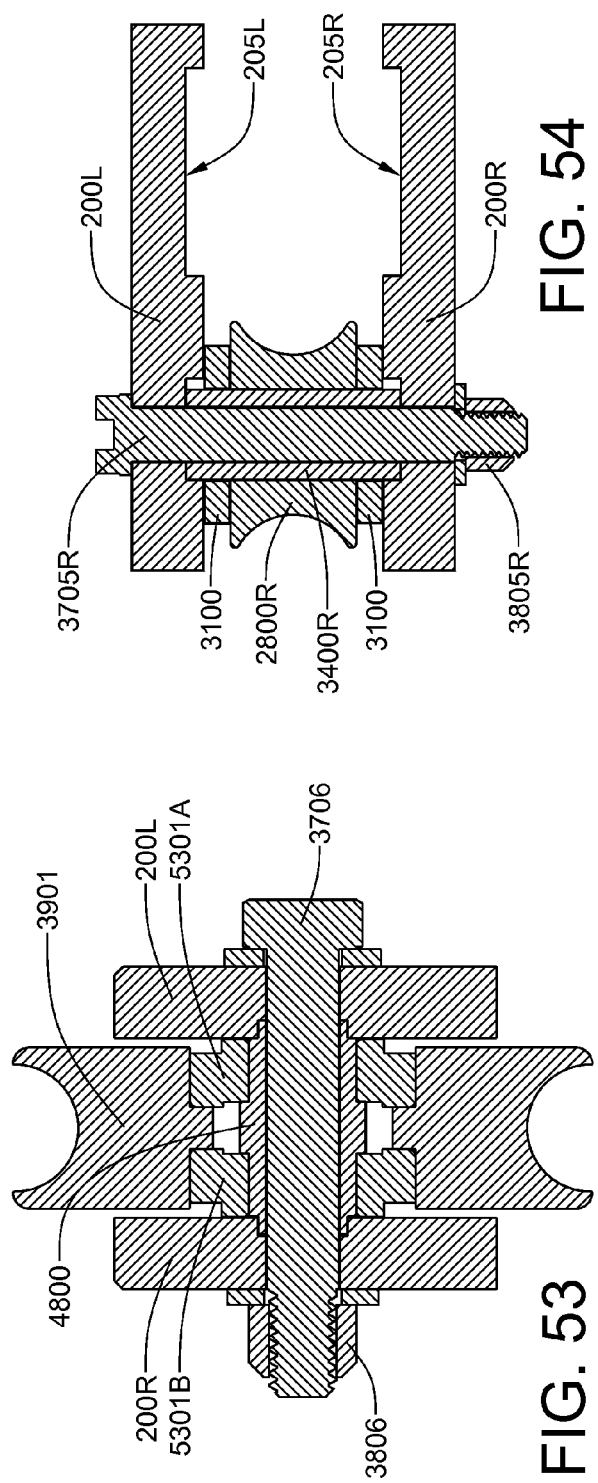

TROLLEY FOR DOWNHILL ZIP LINE THRILL RIDE

FIELD OF THE INVENTION

This invention relates, generally, to suspended cable transport systems commonly known as zip lines and, more particularly, to trolleys for downhill zip line systems which are securely attached to the suspended cable and are designed to control maximum descent speed within a safe range.

BACKGROUND OF THE INVENTION

Transport systems involving a trolley slidable along a suspended length of cable have been known in the art for many years. Commonly known as zip lines, such systems are extensively used for rescue work on ski lift equipment. They are also available as backyard toys for children and adults. Spring Swings, Inc. of Riviera Beach, Fla., manufactures a Fun Ride Deluxe Zip Line kit which can be installed between two trees or other suitable cable supports. The kit includes enough stranded steel aircraft cable for a ride of about 21 meters (70 feet) in length, cable tensioning devices, and a "super tough" double-pulley plastic trolley which travels bidirectionally on the suspended cable. The kit retails for less than $100.

Within the past two decades, zip lines have become part of the "extreme sports" scene. One particular zip line installed on a hill in the Costa Rican jungle has been given rave reviews. The Costa Rican system is really quite primitive, having a trolley with a single deep-groove nylon pulley riding on the suspended cable. In order to slow his descent, a rider must twist the trolley, thereby causing the flanges of the pulley to rub against the cable and generate friction. Kinetic energy is, thus, dissipated as heat. Riders who are particularly heavy may generate so much friction and related heat that the trolley pulley may fail prematurely. Such a system is potentially dangerous, as the riders, themselves, must take responsibility for maintaining their descent speeds within a safe range, in order to avoid smashing into the lower cable support tower. In the absence of a legal system which demands that even the most risk-inclined, incompetent and moronic individuals be protected from themselves, such a zip line system might operate in perpetuity. However, in a country such as the U.S., the slip and fall plaintiffs' bar would kill it almost immediately.

In 2003, a sophisticated, safe, and thoroughly-engineered zip line thrill ride was installed on a steep hill at Park City, Utah. The suspended cable is about 805 meters in length (0.5 mile), and the vertical drop is approximately 183 meters (600 feet). Although maximum speeds in excess of 90 m.p.h. are attainable on the system, the maximum speed experienced by paying riders is automatically limited by the equipment to no more than about 55 m.p.h. Certain components and features of this modern zip line system were the subjects of U.S. Pat. No. 6,666,773 to the same inventor.

The focus of the present invention is a zip line trolley used primarily for downhill thrill rides which are erected as permanent installations and which are often built adjacent ski lifts, in amusement parks, and in other locations with mountainous or hilly terrain frequented by the public.

SUMMARY OF THE INVENTION

The zip line trolley of the present invention is designed for permanent long-term installations of inclined-cable thrill rides, where factors of reliability, safety, low-maintenance, and minimal manipulation by operating personnel are paramount for successful commercial exploitation with minimal personal liability risk. A rider is suspended from the trolley as he/she descends along an inclined cable. The trolley is equipped with a stainless steel main pulley which rides on an upper surface of the inclined cable. The trolley has a brake pad forward of the main pulley which rides against the underside of the inclined cable. Force applied by the brake pad against the cable is accomplished by suspending the rider on the trolley behind the main pulley. The distance behind the main pulley is determined by the angle of inclination of the suspended cable, the weight fo the rider, and the desired maximum speed to be attained during descent. The trolley is designed for use by successive riders without removing the trolley from the inclined cable. After use by each rider, the trolley is towed back to the high-elevation departure point for use by a successive rider. The trolley has a frame to which the brake pad, main pulley, and other components are attached. The frame is constructed principally from a pair of spaced-apart parallel side plates and an inner beam, which is partially sandwiched between the side plates, and extends to the rear edges thereof. The inner beam and side plates are bolted together to form a rigid structure. The inner beam not only acts as a spacer between the side plates, but also has a gallery of block-T-shaped cross-section that extends the length of the inner beam and is open at the bottom. A plurality of apertures equally over the length of the gallery extend transversely through an upper portion thereof. A T-shaped shackle having at least one transverse aperture, is slidably installed and subsequently trapped within the gallery by a cover plate installed at the rear of the inner beam. The at least one transverse aperture in the shackle aligns with each of the transverse apertures in the inner beam as the shackle is slid from one end of the gallery to the other, thereby enabling the shackle to be pinned at incremental distances within the gallery by inserting at least one pull pin through at the least one transverse aperture in the shackle and through an aligned transverse aperture in the inner beam. The end plate has a central aperture to which the retrieval line can be secured with, for example, a carabiner. A bumper, which is preferably made of stainless steel, is bolted between front portions of the side plates. The bumper not only functions as a rigidifying spacer at the front end of the trolley, it also provides protection to the side plates from mechanical damage and wear. In addition, the bumper is has an upwardly-angled lower-front edge which engages a ramp on a receiver at the end of each ride, thereby increasing the force applied by the brake pad against the lower surface of the suspended cable. Greater force equates to greater friction and a faster conversion of kinetic energy of the rider and trolley to heat. The brake pad, which is equipped with transverse grooves which wipe water from the suspended cable as the brake pad slides against the underside thereof, is pivotally mounted on a shoulder bolt that is transversely installed through both side plates. In addition, a pair of rotation-limiting bolts also pass through the brake pad. Pivotal mounting of the brake pad ensures continual maximum contact of brake pad material with the suspended cable. The main pulley is installed in upper middle portion of the frame. The main pulley rotates on a pair of sealed ball bearing races that are pressed on a keyed shaft which slides into opposed grooves machined into each of the side plates. A first auxiliary pulley positioned above the brake pad limits rotation of the trolley about the main pulley shaft as the brake pad is released from the suspended cable during each retrieval operation. A second auxiliary pulley positioned directly behind the main pulley serves as a fail safe device in the extremely remote possibility that the main pulley should suffer catastrophic failure. Each of the auxiliary pulleys is preferably made of high-density polyethylene, and rotates on a hollow cylindrical stainless steel bushing that is transversely bolted in place between both side plates. Each of the unkeyed bushings slides into opposing grooves machined into the side plates. The grooves for the keyed shaft of the main pulley and for the auxiliary pulley bushings are accessible from upper edges of the side plates. A stepped, cylindrical wear insert is pressed into a circular aperture from the inner surface of each side plate. Both cylindrical wear inserts are opposite one another and prevent wear to the precision-machined side plates in the event the trolley becomes misaligned with respect to the cable during descent or retrieval operations. A safety bolt, which passes transversely through both side plates at a location between the brake pad and the front edge of the inner beam provides an anchor for a carabiner which connects a safety strap to a T-hanger on which the rider is suspended.

BRIEF DESCRIPTION OF THE DRAWINGS

FIG. 2 is an outer-side elevational view of the left side plate;

FIG. 3 is a top plan view of the left side plate;

FIG. 4 is a rear elevational view of the left side plate;

FIG. 5 is an inner-side elevational view of the left side plate;

FIG. 6 is a front elevational view of the left side plate;

FIG. 7 is a top plan view of the inner beam;

FIG. 8 is a rear elevational view of the inner beam;

FIG. 9 is a front elevational view of the inner beam;

FIG. 10 is a right-side elevational view of the inner beam;

FIG. 11 is a rear elevational view of the front bumper;

FIG. 12 is a front elevational view of the front bumper;

FIG. 13 is a right-side elevational view of the front bumper;

FIG. 14 is a left-side elevational view of the front bumper;

FIG. 15 is a top plan view of the front bumper;

FIG. 16 is an isometric view of the front bumper;

FIG. 17 is a side elevational view of the shackle;

FIG. 18 is an end elevational view of the shackle;

FIG. 19 is an isometric view of the shackle;

FIG. 21 is a bottom plan view of the brake pad;

FIG. 22 is an isometric view of the brake pad;

FIG. 23 is a side elevational view of the brake pad;

FIG. 24 is an end elevational view of the brake pad;

FIG. 48 is a plan view of the hollow axle of the main pulley, taken at an angle orthogonal to the keyed cutouts at the ends thereof;

FIG. 49 is a plan view of the hollow axle of the main pulley, taken at an angle parallel to the keyed cutouts at the ends thereof;

FIG. 50 is a cross-sectional view of the hollow axle of the main pulley, taken through line 50-50 of FIG. 48;

FIG. 51 is an elevational view of either end of the hollow axle of the main pulley;

FIG. 52 is an isometric view of the hollow axle of the main pulley;

FIG. 53 is a cross-sectional view of the assembled zip line trolley, taken through line 53-53 of FIG. 38;

FIG. 54 is a cross-sectional view of the assembled zip line trolley, taken through line 54-54 of FIG. 38;

PREFERRED EMBODIMENT OF THE INVENTION

Figure 1:
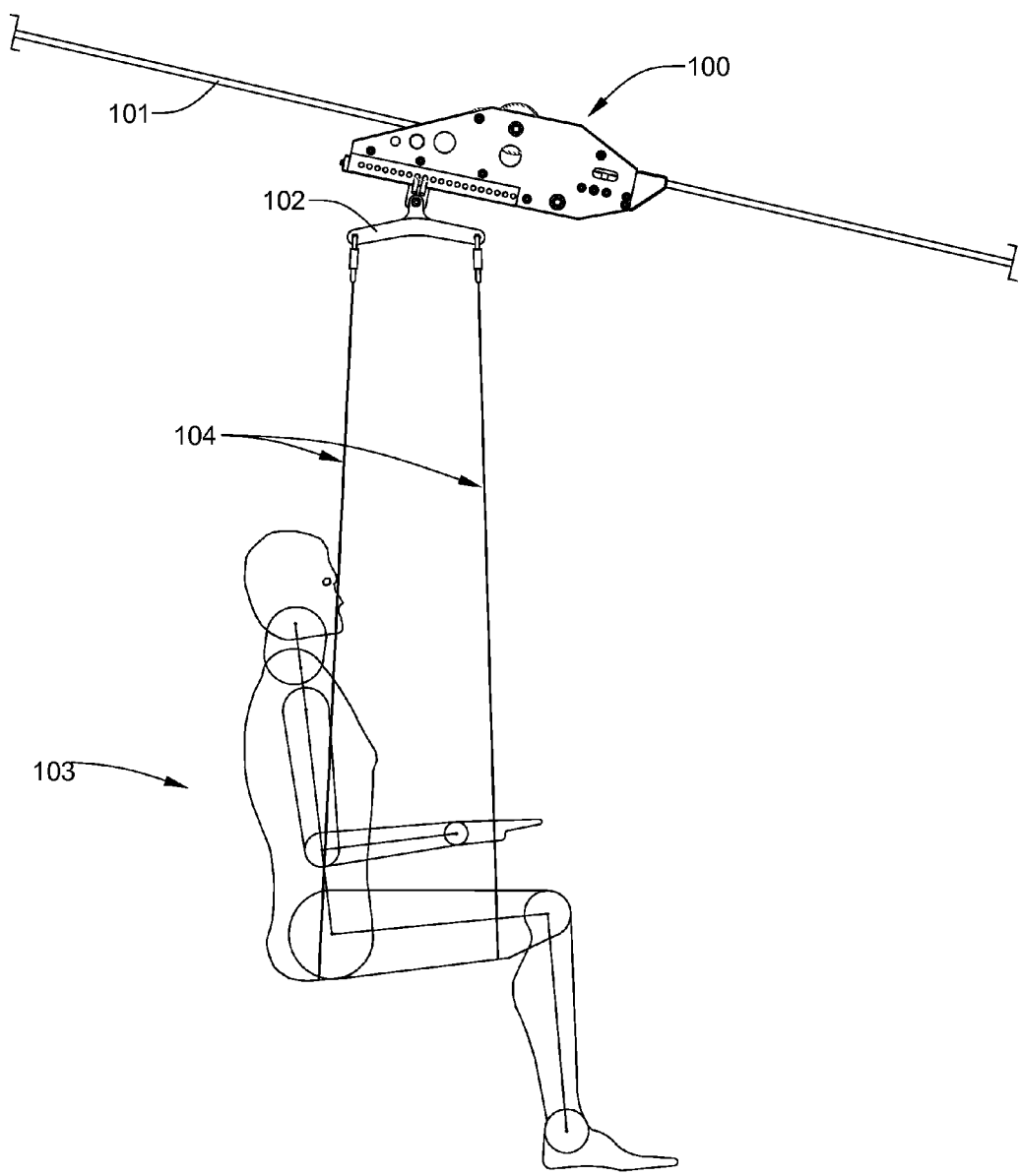
FIG. 1 is a left-side elevational view of the new zip line trolley traveling on a suspended cable, with a rider suspended from the trolley.

The downhill thrill ride zip line trolley will now be described in detail with reference to the attached drawing FIGS. 1 through 54. It should be understood that although the drawings are intended to be merely illustrative, a reasonable attempt has been made to provide drawings which are drawn close to scale. In addition, an effort has been made to ensure that all components shown on a single drawing sheet are drawn to the same scale. For any three-digit item number, the first digit indicates the drawing figure number where the designated item is most clearly seen for the first time. For any four-digit number, the first two digits indicate the drawing figure number where the designated item is most clearly seen for the first time.

Referring now to FIG. 1, the zip line trolley 100 of the present invention is shown suspended from an inclined cable 101. The zip line trolley 100 is designed for permanent, long-term installations of inclined-cable thrill rides, where factors of reliability, safety, low-maintenance, and minimal manipulation by operating personnel are paramount for successful commercial exploitation of the ride with minimal personal liability risk. A hanger apparatus 102 is attached to the trolley 100 and a rider 103 is suspended from the hanger apparatus 102 preferably with four cables or straps 104, only two of which are visible. The zip line trolley 100 is designed for use by successive riders without removing the trolley from the inclined cable 101. After use by each rider, the trolley 100 is towed back to the high-elevation departure point for use by a successive rider.

Referring now to FIGS. 2 through 6, various views of a left side plate 200 are shown. The trolley 100 is fabricated using a left side plate 200L and a right side plate, which is a mirror image of the left side plate 200. The right side plate 200R is visible in the exploded drawing of FIG. 20. For a preferred embodiment of the trolley 100, the side plates 200L and 200R are precision machined preferably from No. 7075 aluminum alloy. It will be noted that the left side plate 200L has a left-hand main pulley groove 201L with a left-hand main pulley bolt aperture 202L, a left-hand front auxiliary pulley groove 203L with a left-hand front auxiliary pulley bolt aperture 204L, a left-hand rear auxiliary pulley groove 205L with a left-hand rear auxiliary pulley bolt aperture 206L, and a left-hand bumper locking groove 207L. It will be further noted that the left side plate 200 has four left-hand inner beam securing apertures 208L-A to 208L-D, top and bottom lower left-hand bumper securing apertures 209L-T and 209L-B, respectively, a left-hand brake pad pivot aperture 210L, front and rear left-hand pivot-rotation-limiting bolt apertures 211L-F and 211L-R, and a left-hand wear insert aperture 212L. The features on the right side plate 200R are labeled similarly, but with the letter "R", rather than the letter "L" immediately following the three-digit item number.

Referring now to FIGS. 7 through 10, a inner beam 700 serves as a spacer between the left side plate 200L and the right side plate 200R. The inner beam 700 has a longitudinal gallery 801 of generally square cross-section that extends the length of the inner beam 700 and is open at the bottom through a longitudinal slot 802. The inner beam 700 also has left and right threaded apertures 803L and 803R, respectively, at the rear end thereof. In addition, the inner beam 700 has a longitudinal upper rib 804, which extends the entire length thereof. The longitudinal rib 804 has a set of four transverse plate-securing apertures 1001A to 1001D, which align with the inner beam securing apertures 208L-A to 208L-D of the left side plate 200L, respectively, and with the mirror-image inner beam securing apertures 208R-A to 208R-D of the right side plate 200L (please refer to FIG. 20 to view axial alignment of bolt holes). Additionally, a plurality of transverse apertures 1002A through 1002T, equally spaced over the length of the gallery 801, transversely penetrate the gallery 801.

Referring now to FIGS. 11 through 16, a bumper 1100, which is preferably made from stainless steel or, alternatively, from a durable polymeric material such as Teflon®, nylon, or high-density polyethylene (HDPE), also serves as a rigidifying spacer between front portions of the side plates 200L and 200R. The precisely-spaced right and left rear faces 1301 and 1401, respectively, of the bumper 1100 are designed to fit between the front inner edges 212L and 212R of left and right side plates 200L and 200R, respectively. The bumper 1100 also provides protection to the side plates 200L and 200R against mechanical damage and wear. The bumper 1100 has a set of top and bottom plate-securing apertures 1302T and 1302B which align with the top and bottom left-hand bumper securing apertures 209L-T and 209L-B, respectively, of the left side plate 200L and with the mirror-image bumper securing apertures 209R-T and 209R-B of the right side plate 200R (Please refer, once again, to FIG. 20 to view axial alignment of bolt holes). The bumper 1100 also has an upwardly-angled lower-front face 1201, which engages the interior surface of a conical receiver (not shown) at the end of each ride, thereby increasing braking force and aiding in deceleration of the trolley 100 and of the suspended rider 103. In addition, the bumper 1100 has an upward-facing central groove 1101 that provides clearance for the suspended cable 101 that passes through it. It will be noted that the bumper 1100 has a left locking protrusion 1102L at the top of the left rear face 1301 and a right locking protrusion 1102R at the top of the right rear face 1401 of the bumper 1100. The function of left-hand locking protrusion 1102L and right-hand locking protrusion 1102R will be explained when FIG. 20 is hereinafter described.

Referring now to FIGS. 17 through 19, a T-shaped shackle 1700 has a top portion 1701 that slides within the gallery 801 of the inner beam 700, and a bottom portion 1702 that slides within the slot 802 of the inner beam 700 and extends below the inner beam 700. The shackle 1700 has a pair of transverse apertures 1703A and 1703B that align with the transverse apertures 1002A through 1002T that penetrate the gallery 801, thereby enabling the shackle 1700 to be pinned within the gallery 801 at selected incremental longitudinal positions therein. The bottom portion 1702 has a transverse attachment aperture 1704, which serves as a suspension attachment point for a rider 103. For a presently preferred embodiment of the invention, the shackle 1700 is fabricated from No. 304 stainless steel.

Figure 20:
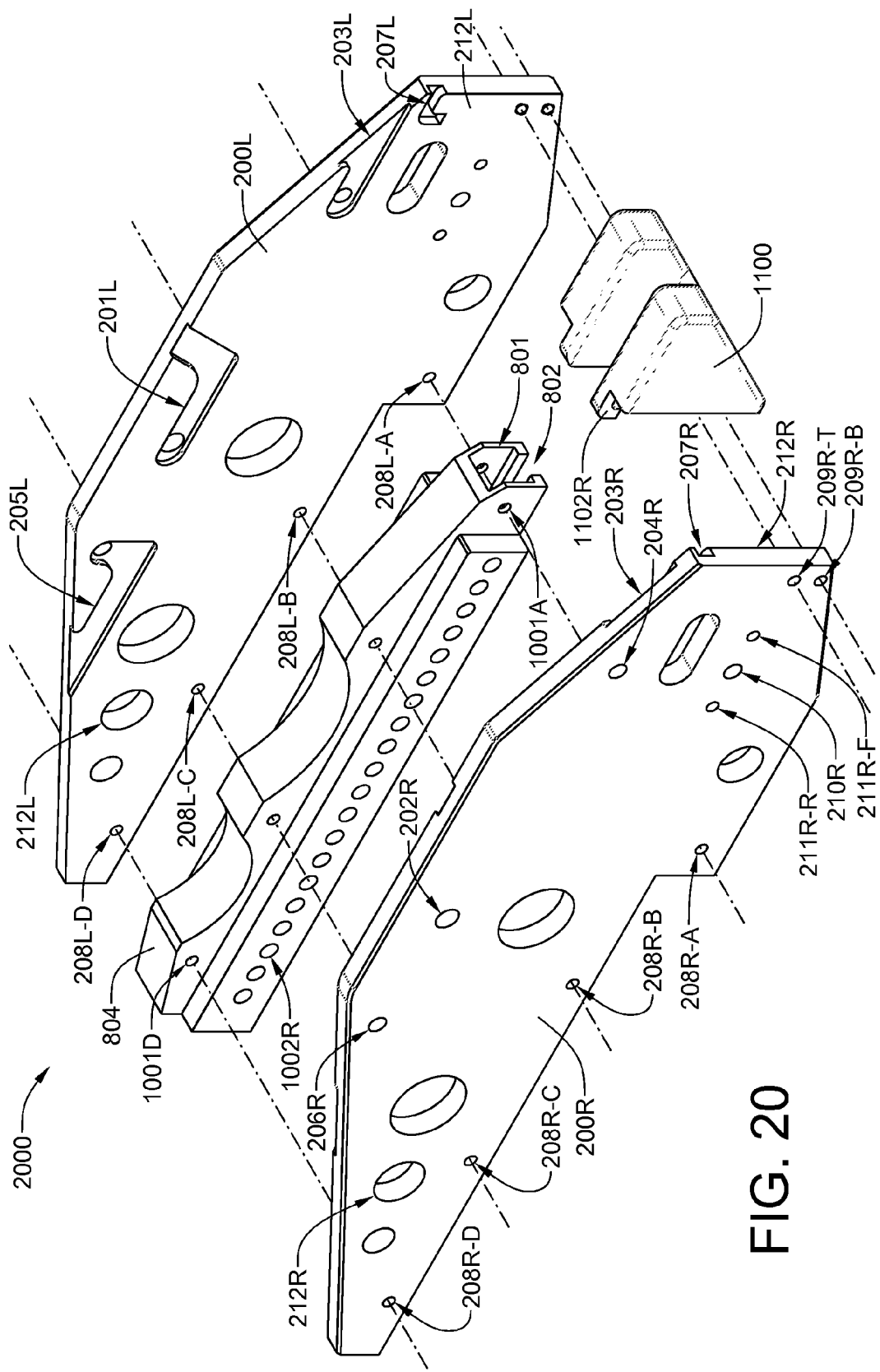
FIG. 20 is an exploded view of the frame, which consists of a right side plate, a left side plate, an inner beam and a front bumper.

Referring now to FIG. 20, this explodes view of the right and left side plates 200L and 200R, the inner beam 700 and the bumper 1100 show how these pieces fit together. The right and left side plates 200L and 200R, respectively, the inner beam 700 and the bumper 1100 are all bolted together into a rigid assembly to form the frame 200 of the zip line trolley 100. In this drawing, it is very clear how the left-hand locking protrusion 1101L fits into the left-hand bumper locking groove 207L of the left side plate 200L. The right-hand locking protrusion 1101R fits into the right-hand bumper locking groove 207R of the right side plate 200R in a similar manner. The locking protrusions 1102L and 1102R, in combination with the bumper locking grooves 207L and 207R prevent the bumper 1100 from rocking back and forth. If a bolt were inserted through the upper half of the bumper 1100, it would interfere with the passing of the suspended cable 101 through the upward-facing central groove 1101 of the bumper 1100.

Referring now to FIGS. 21 through 24, a brake pad 2100 is equipped with transverse grooves 2201A and 2201B, which wipe water from the suspended cable 101 as the brake pad 2100 slides against the underside of the cable. The brake pad 2100 has a central aperture 2301 for pivotal mounting of the brake pad 2100. In addition, a pair of arcuate, elongated apertures 2302A and 2302B receive a pair of bolts which limit pivoting of the brake pad 2100 to an arc of fixed angle. In FIG. 22, the cable contact surfaces 2202 are clearly visible. The brake pad is preferably made from a durable material, such as Becisunt® manufactured by BECORIT GmbH of Recklinghausen, Germany, friction compounds mixed with phenol formaldehyde synthetic thermosetting resins, ultra-high-molecular-weight polyethylene (UHMWPE), nylon or other similar polymeric compounds. Alternatively, it can be made of a friction material used for brake pads on bicycle rim brakes. Linear-pull brakes, V-brakes, single-pivot side-pull brakes, center-pull brakes and side-pull brakes are the most common types of bicycle rim brakes.

Figure 25:
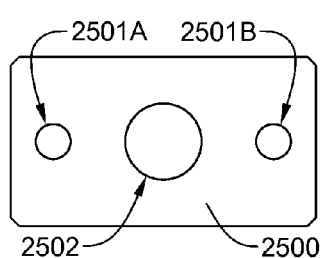
FIG. 25 is a front or rear elevational view of the end plate.
Figure 26:
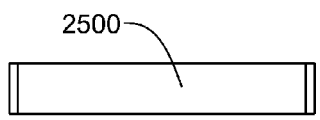
FIG. 26 is a top or bottom plan view of the end plate.
Figure 27:
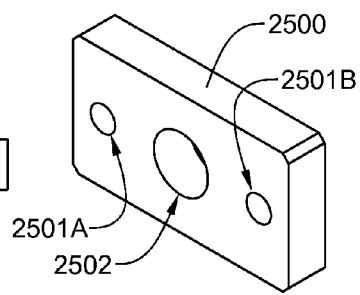
FIG. 27 is an isometric view of the end plate.

Referring now to FIGS. 25 through 27, a cover plate 2500, having a pair of securing apertures 2501A and 2501B, bolts to the rear end 803 of the inner beam 700. The shackle 2500 and a bolt 3701A passing through aperture 208A of the inner beam 700, trap the shackle 3900 within the gallery 801. The cover plate 2500 also has a central aperture 2502 to which the retrieval line may be secured with, for example, a carabiner (not shown).

Figure 28:
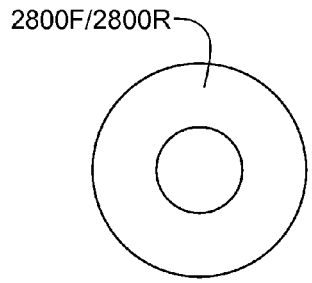
FIG. 28 is a plan view of the front or rear auxiliary pulley.
Figure 29:
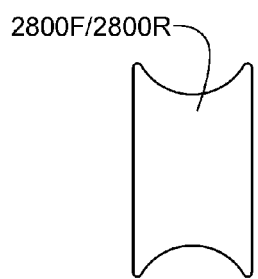
FIG. 29 is an elevational view of the front or rear auxiliary pulley, taken orthogonal to the axis thereof.
Figure 30:
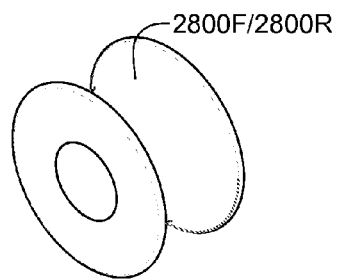
FIG. 30 is an isometric view of the front or rear auxiliary pulley.

Referring now to FIGS. 28 through 30, an auxiliary pulley 2800F or 2800R is shown in various views. Two identical front and rear auxiliary pulleys 2800F and 2800R, respectively, are installed within the zip line trolley 100. There function will be hereinafter described. For a presently preferred embodiment of the invention, each of the auxiliary pulleys 2800F and 2800R is made from polyoxymethylene (POM), an engineering thermoplastic used in precision parts that require high stiffness, low friction and excellent dimensional stability. It is commonly known by its DuPont trade name Delrin®.

Figure 31:
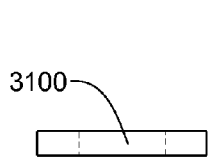
FIG. 31 is a plan view of a thrust washer that is intended for installation on opposite sides of both the front and rear auxiliary pulleys.
Figure 32:
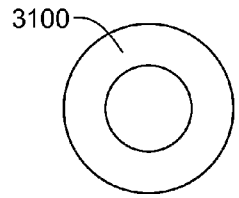
FIG. 32 is a side elevational view of the thrust washer.
Figure 33:
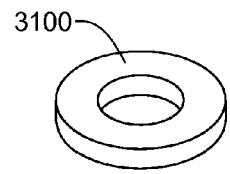
FIG. 33 is an isometric view of the thrust washer.

Referring now to FIGS. 31 to 33, a single thrust washer 3100 is shown in various views. A thrust washer 3100 is installed on opposite sides of an auxiliary pulley 2800A or 2800B. For a presently preferred embodiment of the invention, each of the thrust washers 3100 is, preferably, made from brass.

Figure 34:
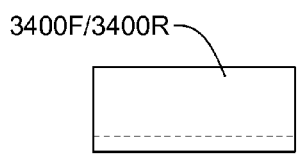
FIG. 34 is a plan view of an auxiliary pulley hollow cylindrical axle.
Figure 35:
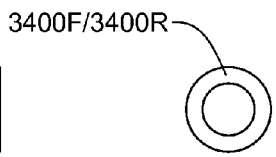
FIG. 35 is an end view of an auxiliary pulley hollow cylindrical axle.
Figure 36:
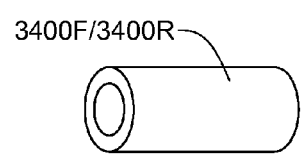
FIG. 36 is an isometric view of an auxiliary pulley hollow cylindrical axle.
Figure 37:
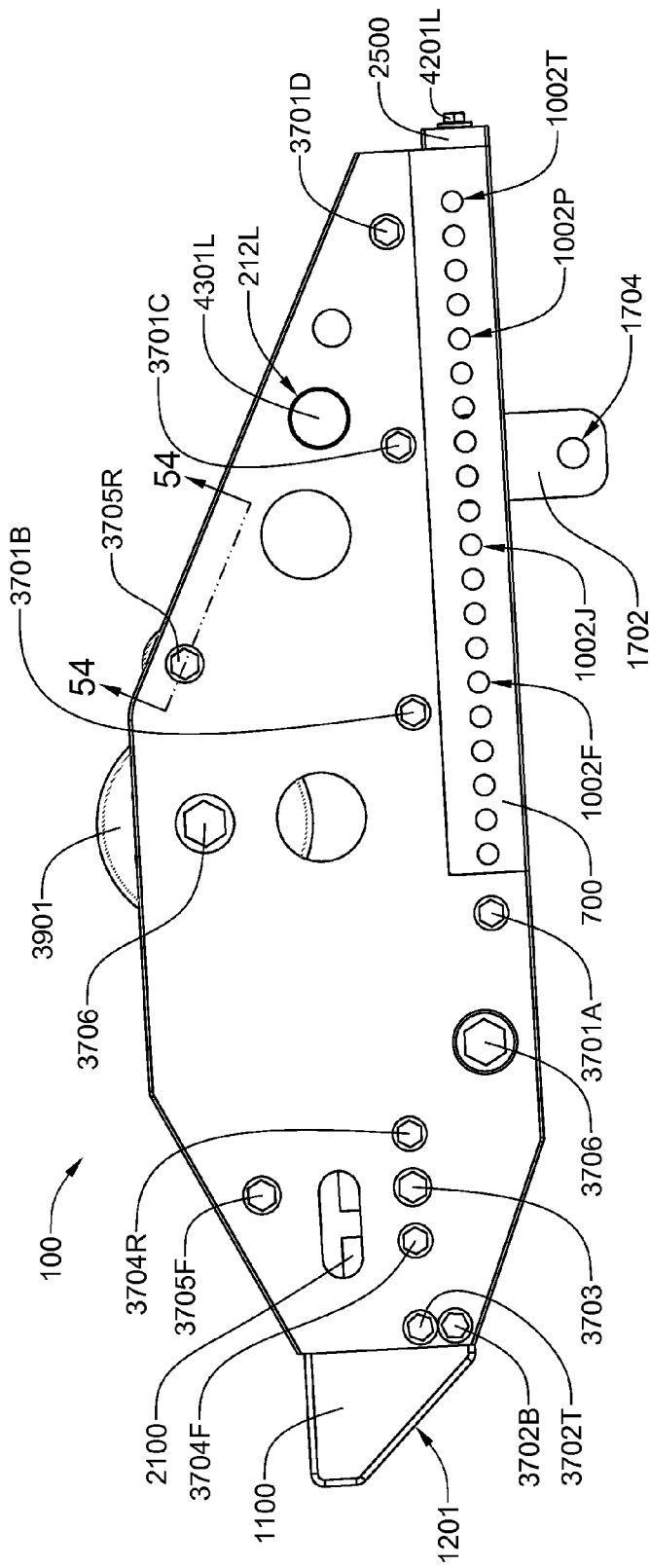
FIG. 37 is a left-side elevational view of the assembled zip line trolley.
Figure 38:
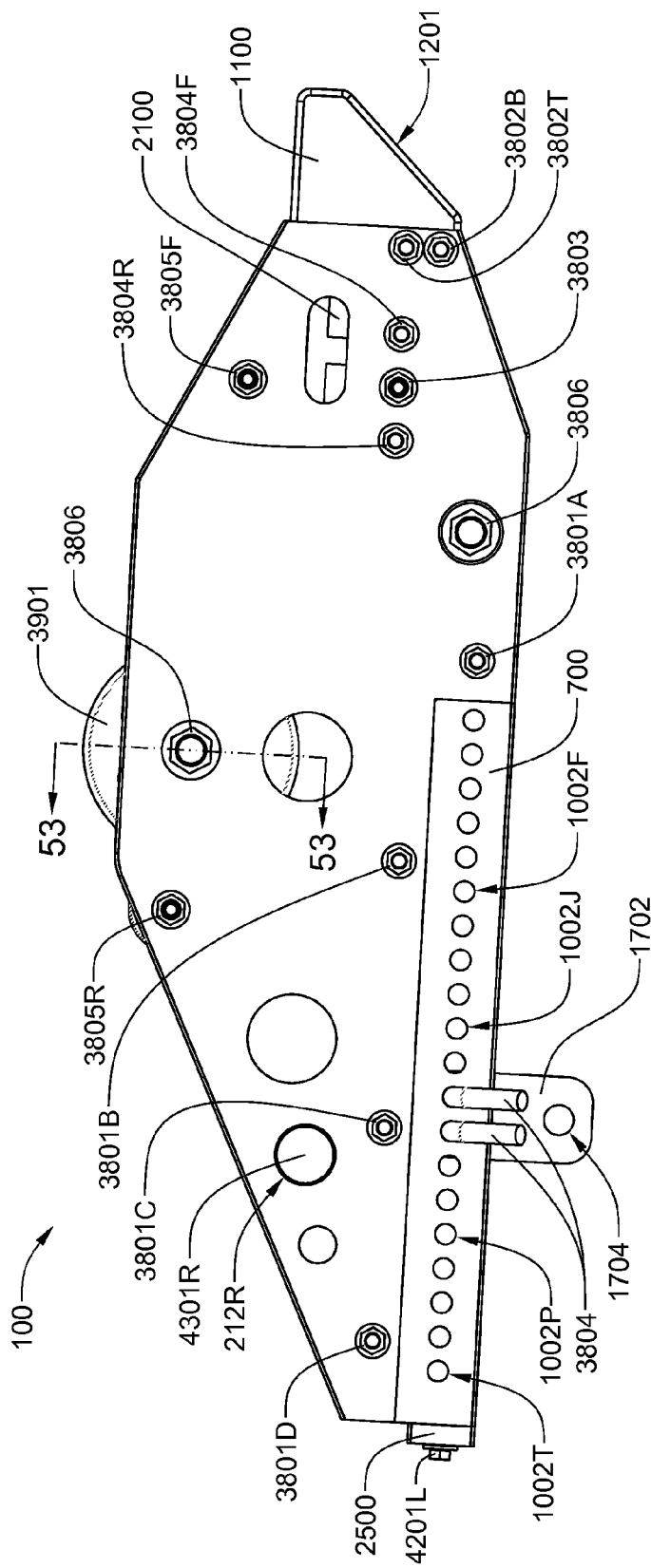
FIG. 38 is a right-side elevational view of the assembled zip line trolley.
Figure 39:
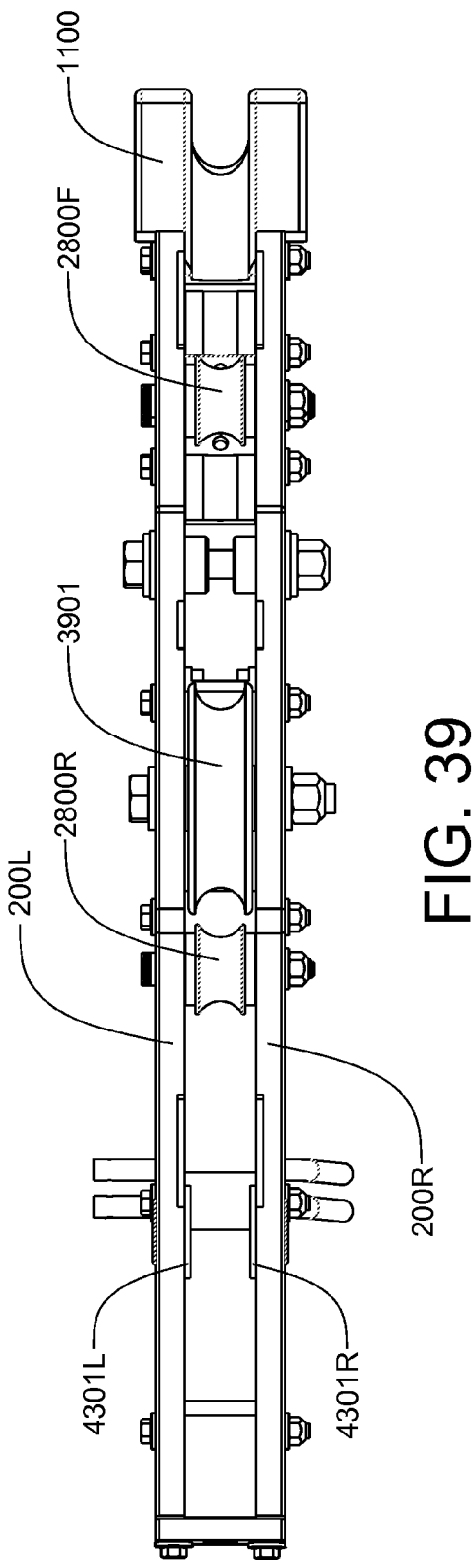
FIG. 39 is a top plan view of the assembled zip line trolley.

Referring now to FIGS. 34 to 36, a hollow unkeyed cylindrical stainless steel bushing 3400F or 3400R is shown in various views. One such bushing functions as an axle for each of the auxiliary pulleys 2800A or 2800B. A central aperture 3401 enables each bushing 3400F or 3400R to be bolted in place on the trolley 100, and an auxiliary pulley 2800A or 2800B to be rotatably installed thereon.

Referring now to the fully-assembled zip line trolley of FIGS. 37 through 47, the trolley frame, as previously stated, is constructed primarily from the right and left, spaced-apart parallel side plates, 200L and 200R, respectively, the inner beam 700, (which is partially sandwiched between the side plates 200L and 200R, and which extends to the rear edges of the side plates 200L and 200R), and the bumper 1100. The inner beam 700 and side plates 200L and 200R are bolted together with bolts 3701A-3701D and nylon-insert locking nuts 3801A-3801D to form a rigid structure. The inner beam 700 and the bumper 1100 act as spacers between the side plates 200L and 200R. An top bumper-securing bolt 3702T passes through the top left-hand bumper securing aperture 209L-T in the left side plate 200L, through the top plate securing aperture 1302T in the bumper 1100, and through the top right-hand bumper securing aperture 209R-T in the right side plate 200R. The threaded end of the top bumper-securing bolt 3702T is secured with a nylon-insert locking nut 3802T. Likewise, a bottom bumper-securing bolt 3702B passes through the bottom left-hand bumper securing aperture 209L-B in the left side plate 200L, through the bottom plate securing aperture 1302B in the bumper 1100, and through the bottom right-hand bumper securing aperture 209R-B in the right side plate 200R. The threaded end of the bottom bumper-securing bolt 3702B is secured with a nylon-insert locking nut 3802B.

Still referring to FIGS. 37 through 47, the brake pad 2100 is pivotally mounted between the side plates 200L and 200R on a pivot shoulder bolt 3703 which passes through the left-hand brake pad pivot aperture 210L of the left side plate 200L, the central aperture 2301 of the brake pad 2100, the right-hand brake pad pivot aperture 210R of the right side plate 200R, and is secured with a nylon-insert locking nut 3803. Pivot rotation of the brake pad 2100 is limited by rotation-limiting shoulder bolts 3704F and 3704R. The front rotation-limiting shoulder bolt 3704F passes through the front pivot-rotation-limiting bolt aperture 211L-F in the left side plate 200L, the front arcuate elongated the pivot aperture 2302A in the brake pad 2100, and the front pivot-rotation-limiting bolt aperture 211R-F in the right side plate 200R, and is secured with a nylon-insert locking nut 3804F. Likewise the rear rotation-limiting shoulder bolt 3704R passes through the rear pivot-rotation-limiting bolt aperture 211L-R in the left side plate 200L, the rear arcuate elongated the pivot aperture 2302B in the brake pad 2100, and the rear pivot-rotation-limiting bolt aperture 211R-R in the right side plate 200R, and is secured with a nylon-insert locking nut 3804R.

Still referring to FIGS. 37 through 47, the zip line trolley 100 is equipped with a main pulley 3901 that is mounted between the left and right side plates 200L and 200R in an upper center portion of the frame 2000. For a presently preferred embodiment of the invention, the main pulley 3901 is fabricated from No. 304 stainless steel. Mounting of the main pulley 3901, which rides on an upper surface of the inclined cable 101, will be explained in greater detail with reference to FIGS. 48 through 53. The brake pad 2100, which is positioned forward of the main pulley 3901, slides against the underside of the inclined cable 101. Pivotal mounting of the brake pad 2100 ensures continual maximum contact of brake pad material with the suspended cable 101. Force applied by the brake pad 2100 against the cable 101 is accomplished by suspending the rider 103 on the trolley 100 behind the main pulley 3901. The distance the rider 103 will be suspended behind the main pulley 3901 is determined by the angle of inclination of the suspended cable 101, the weight of the rider 103, and the desired maximum speed to be attained during descent. The greater distance that the rider 103 is suspended rearward of the main pulley, the greater the force applied by the brake pad 2100 against the lower surface of the suspended cable 101. Greater force equates to greater friction and a faster conversion of kinetic energy of the rider and trolley to heat. The transverse apertures 1703A and 1703B in the shackle 1700 align at incremental intervals with transverse apertures 1002A to 1002T which penetrate the gallery 801 of the inner beam 700. The shackle 1700 can be secured at any of these incremental intervals by inserting one or more pull pins 3804 through both the transverse apertures 1002 of the gallery and at least one transverse aperture 1703A or 1703B of the shackle 1700.

Still referring to FIGS. 37 through 47, the zip line trolley 100 is equipped with a front auxiliary pulley 2800F, that is positioned above the brake pad 2100, and that limits rotation of the trolley 100 about the rotational axis of the main pulley 3901 as the brake pad 2100 is pulled away from the suspended cable 101 by the rearward force of the retrieval line during each retrieval operation. A rear auxiliary pulley 2800R, that is positioned directly behind the main pulley 3901, serves as a fail safe device in the extremely unlikely event that the main pulley 3901 should become detached from the frame 2000. Each of the auxiliary pulleys 2800F and 2800R rotates on identical hollow unkeyed cylindrical stainless steel bushings 3400F and 2800R, respectively (seen in the various views of FIGS. 34 through 36). The front stainless steel bushing 3400F slides into opposing left- and right-hand front auxiliary pulley groove 203L and 203R, respectively, and is secured in position through front auxiliary pulley bolt apertures 204L and 204R with a front auxiliary pulley shoulder bolt 3705F and a nylon-insert locking nut 3805F. Likewise, the rear stainless steel bushing 3400R slides into opposing left- and right-hand rear auxiliary pulley groove 205L and 205R, respectively, and is secured in position through front auxiliary pulley bolt apertures 206L and 206R with a rear auxiliary pulley shoulder bolt 3705R and a nylon-insert locking nut 3805R. The front pair of opposed grooves 203L and 203R are accessible from the front top edges of 4501L and 4051R of the left and right side plates 200L and 200R, respectively. Likewise, the rear pair of opposed groves 205L and 205R are accessible from the rear top edges 4502L and 4502R of the left and right side plates 200L and 200R, respectively. A safety shoulder bolt 3706, which passes transversely through left and right side plates 200L and 200R, respectively, and secured with a nylon-insert locking nut 3806, at a location between the brake pad 2100 and the front edge 4001 of the inner beam 700, provides an anchor for a carabiner which connects a safety strap to a T-hanger on which the rider is suspended. Identical plastic spacers 3902L and 3902R against the inner walls of the left and right side plates 200L and 200R, respectively, prevent the carabiner from causing wear on the inner surfaces of the left and right side plates 200L and 200R.

Figure 42:
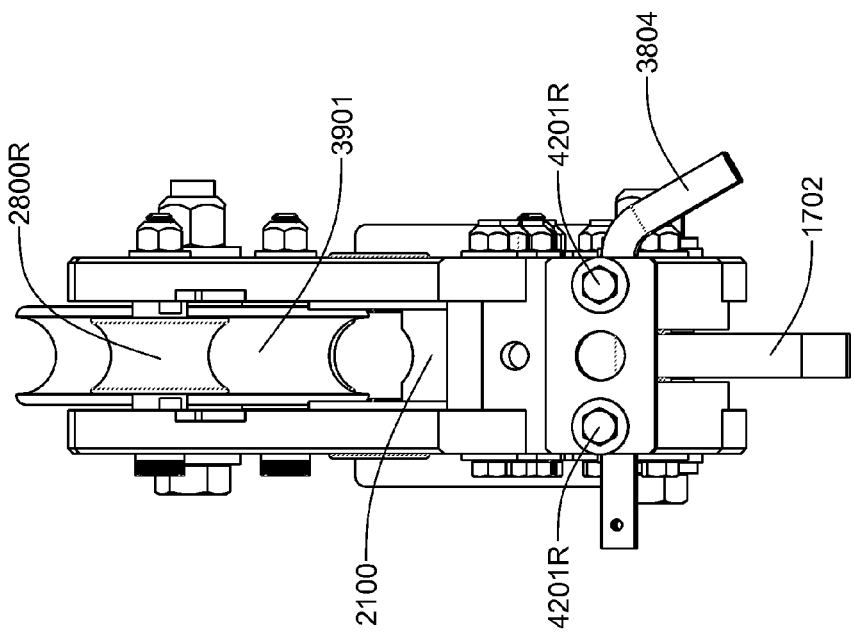
FIG. 42 is a rear elevational view of the assembled zip line trolley.
Figure 41:
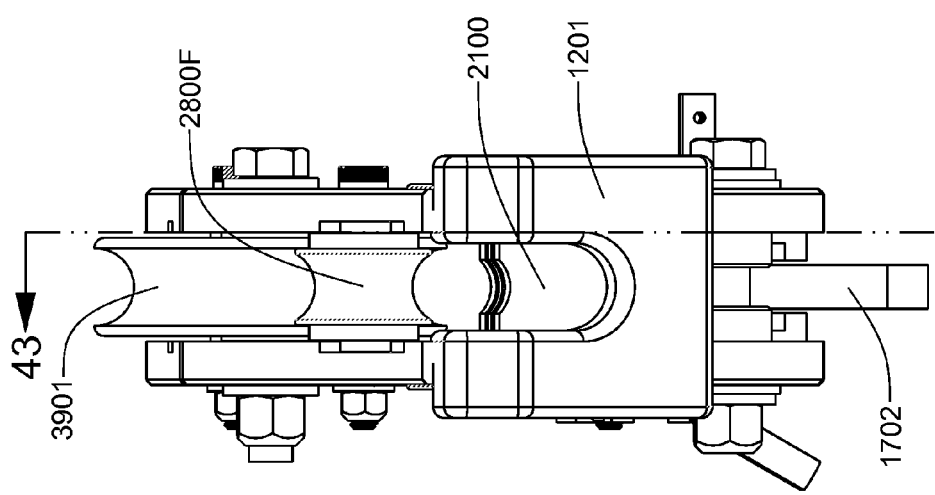
FIG. 41 is a front elevational view of the assembled zip line trolley.

Referring now specifically to FIG. 42, the cover plate 2500 has been secured to the rear end of inner beam 700 using cap screws 4201L and 4201R which engage the threads of threaded apertures 803L and 803R, respectively.

Figure 40:
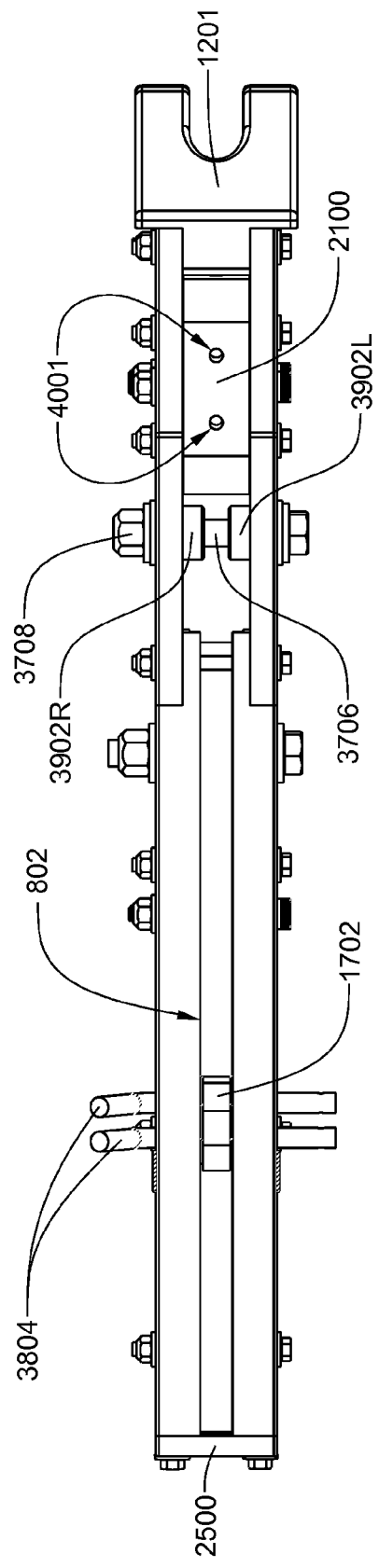
FIG. 40 is a bottom plan view of the assembled zip line trolley.

Referring now specifically to FIG. 40, drain holes 4001 at the bottom of each U-shaped groove 2201A and 2201B in the brake pad 2100 are clearly visible. These drain holes facilitate the escape of water that has been wiped from the suspended cable 101.

Figure 43:
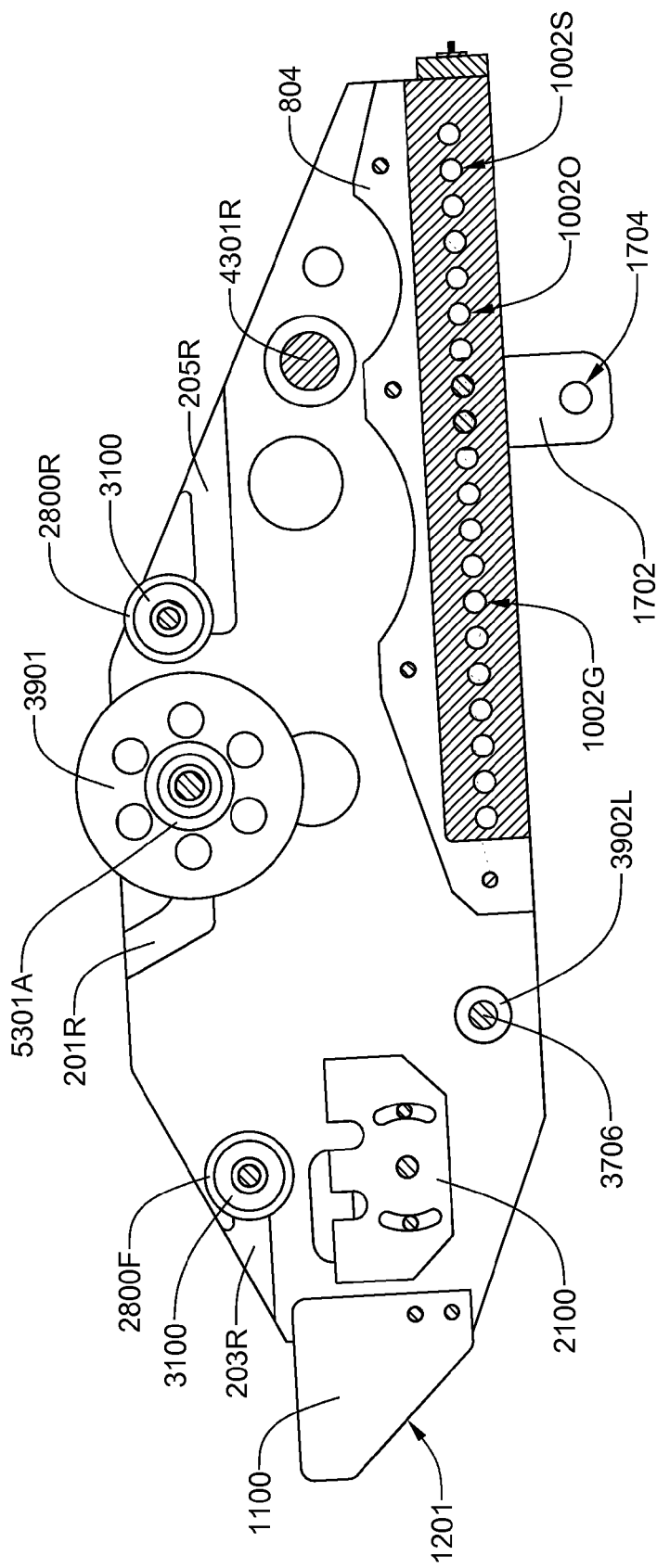
FIG. 43 is cross-sectional view of the assembled zip line trolley, taken through line 43-43 of FIG. 41.
Figure 44:
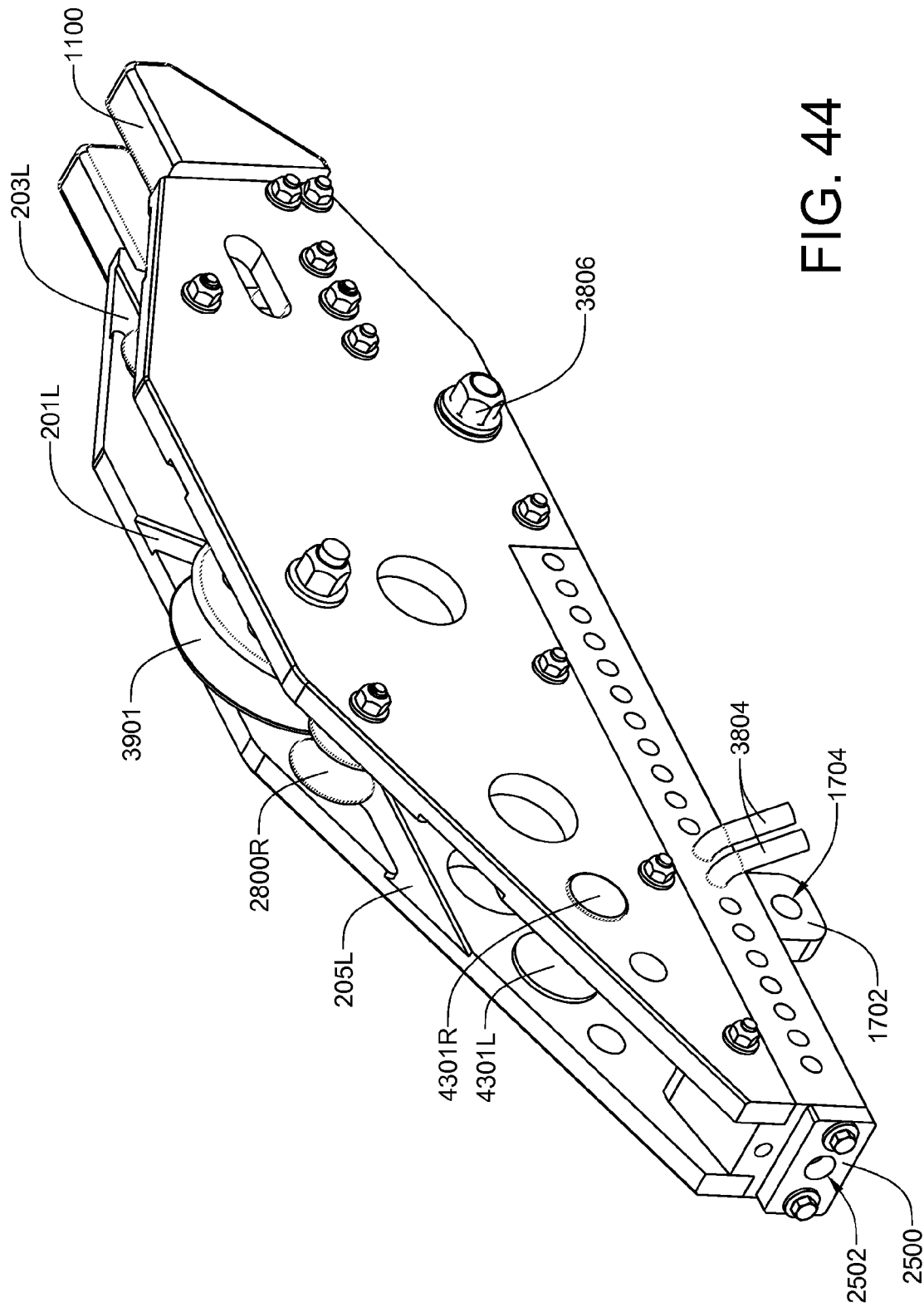
FIG. 44 is a top-right-rear isometric view of the assembled zip line trolley.
Figure 45:
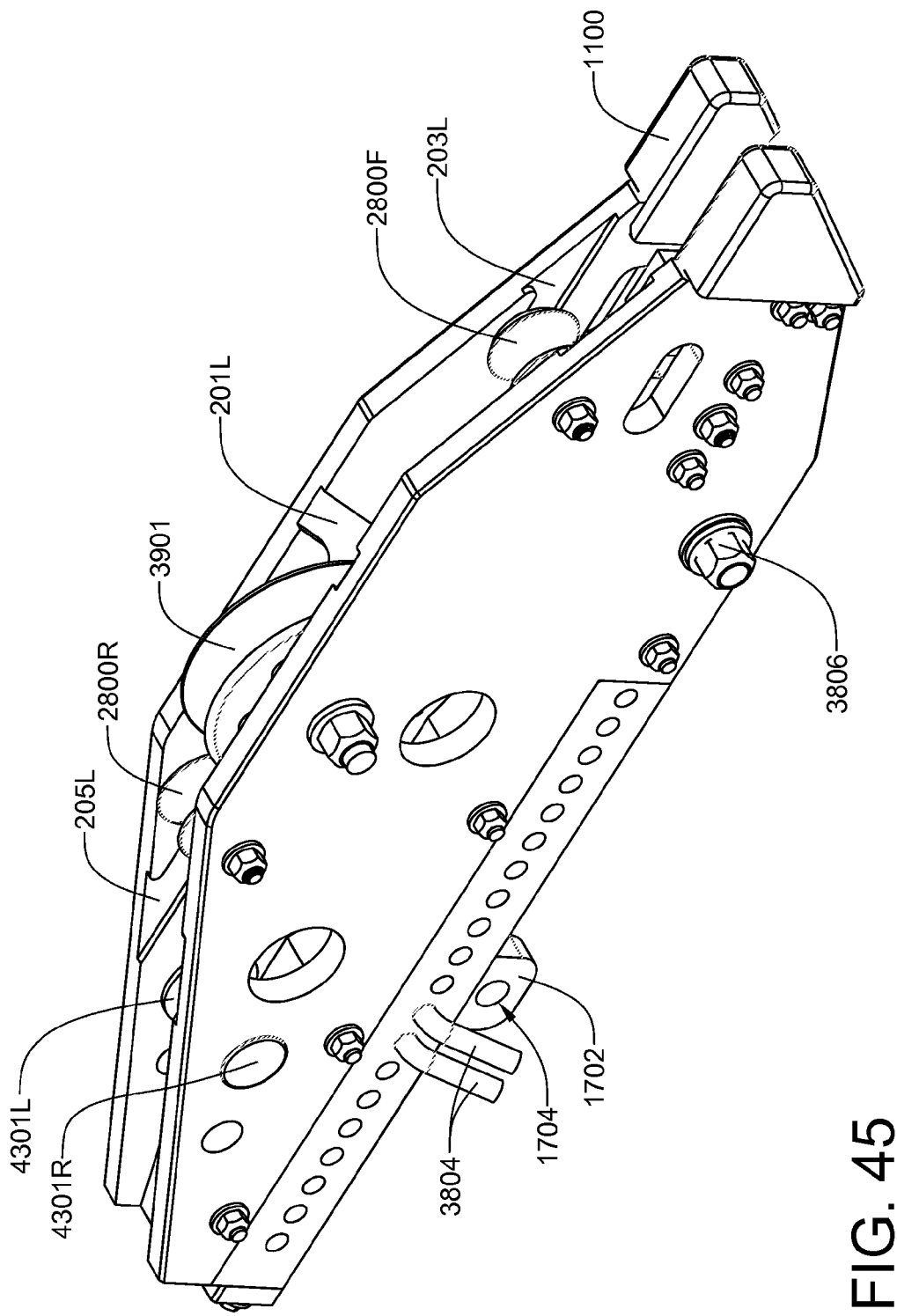
FIG. 45 is a top-right-front isometric view of the assembled zip line trolley.
Figure 46:
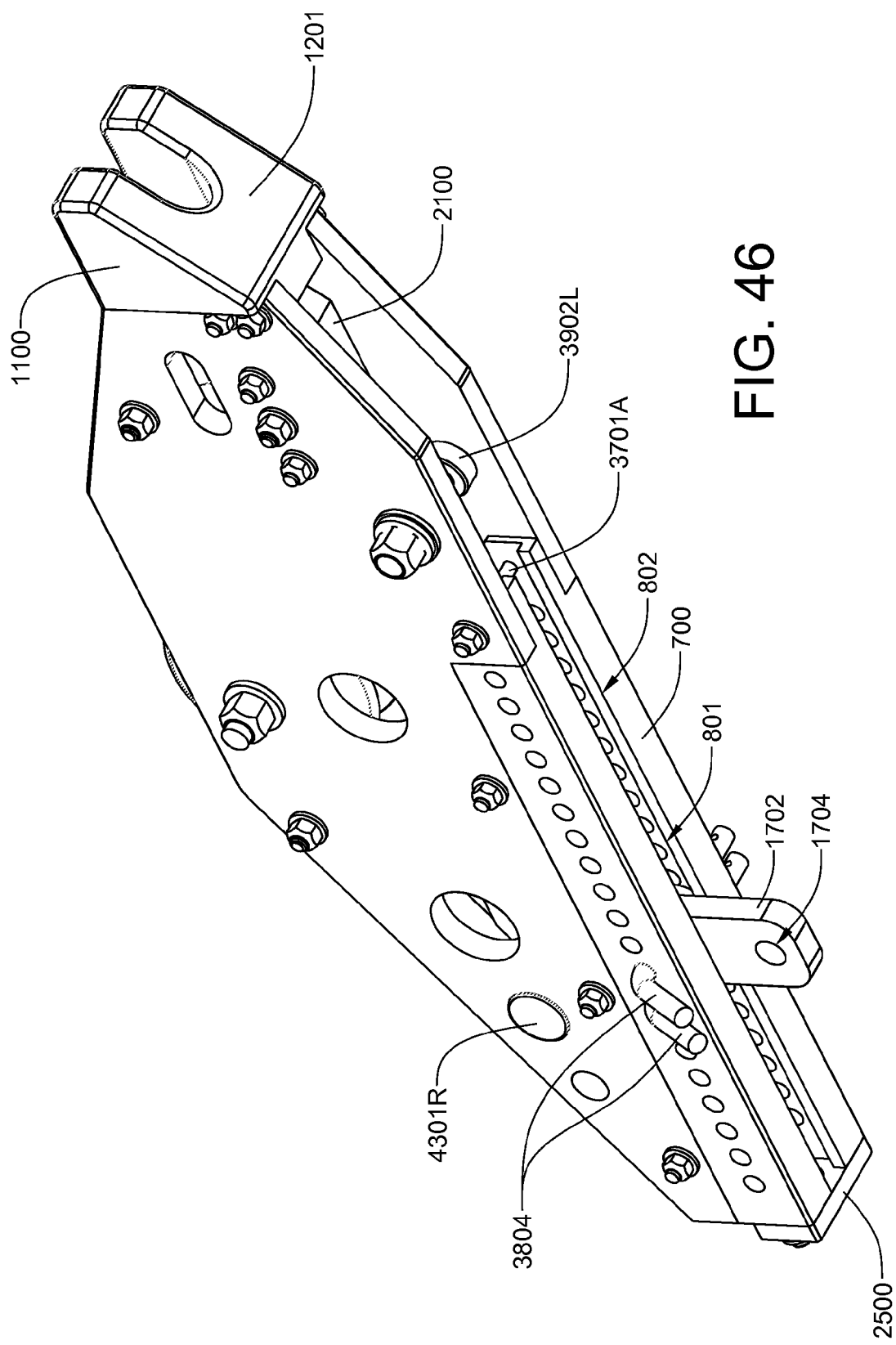
FIG. 46 is a bottom-right-front isometric view of the assembled zip line trolley.
Figure 47:
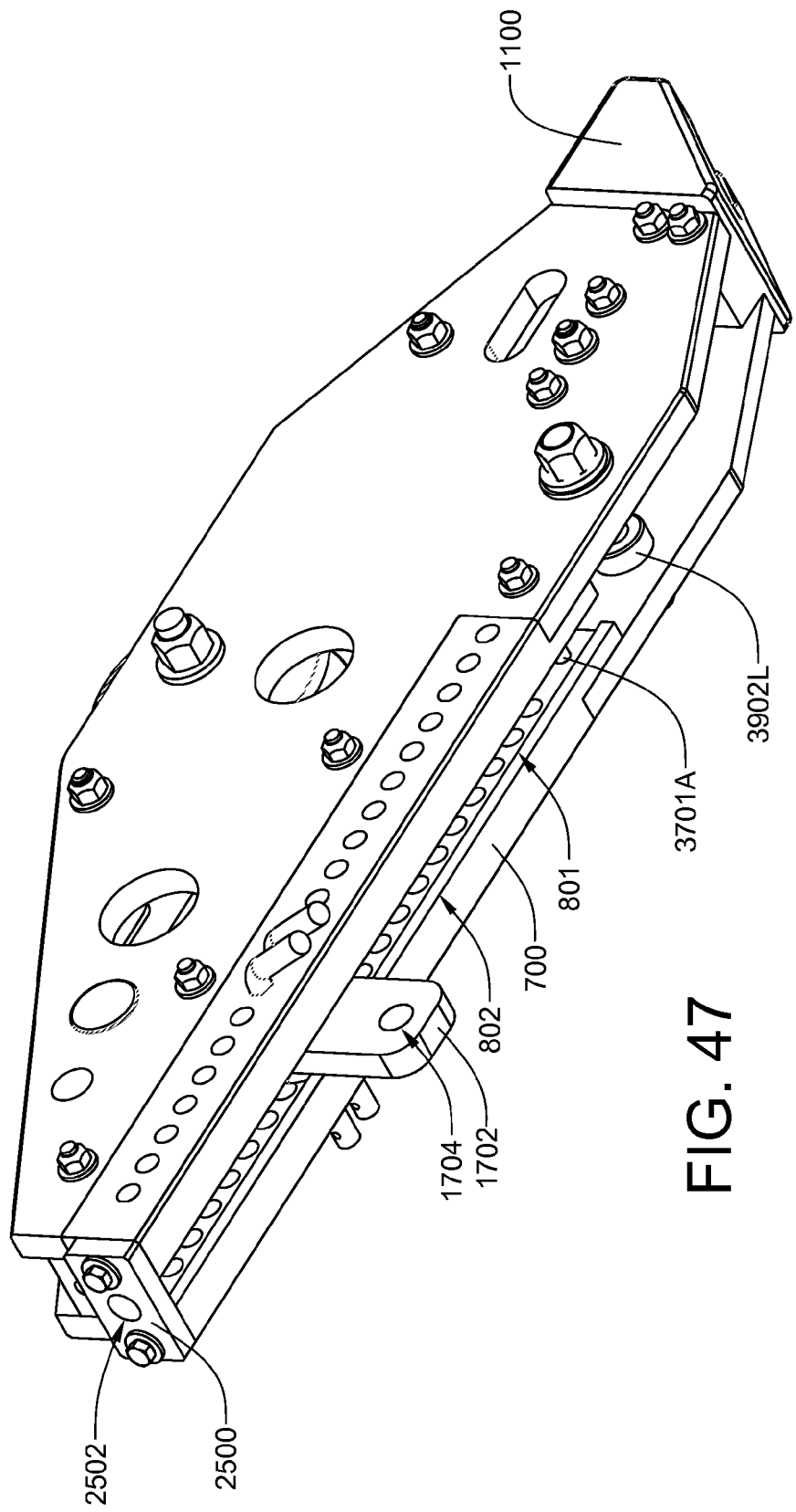
FIG. 47 is a bottom-right-rear isometric view of the assembled zip line trolley.

Referring now specifically to FIG. 43, a first stepped, cylindrical wear insert 4301L has been pressed into the left-hand wear insert aperture 212L in the left side plate 200L from the inner surface thereof. Likewise, a second stepped cylindrical wear insert 4301R (visible in FIG. 39) has been pressed into the right-hand wear insert aperture 212R in the right side plate 200R from the inner surface thereof. Both cylindrical wear inserts 4301L and 4301R are physically identical, and are positioned opposite one another and prevent wear to the precision-machined side plates 102 and 201 in the event the trolley 100 becomes misaligned with respect to the cable 5401 during descent or retrieval operations.

Referring now to FIGS. 48 through 52, a main pulley axle 4800, on which the main pulley 3901 is mounted between the side plates 200L and 200R is shown in various views. It will be noted that each end of the axle 4800 has a cylindrical central aperture 5101 and is keyed with a pair of opposed flats 5102A and 5102B. The keyed ends of the axle 4800 fit snugly into the opposed grooves 201L and 201R in the side plates 200L and 200R, respectively, thereby preventing the axle 4800 from spinning. It will be further noted that the axle 4800 has a central annular step 5201.

Referring now to the cross-sectional view of FIG. 53, the main pulley 3901 rotates on a pair of sealed ball bearing assemblies 5301A and 5301B that are pressed onto the hollow axle 4800. A central internal flange 5302 on the main pulley 3901 maintains the main pulley 3901 centered on the hollow axle 4800. It will be noted that although the ball bearing assemblies 5301A and 5301B are diagrammatically represented as being solid, in reality the outer portion of assembly is separate from the inner portion, with ball bearings running in races in each of the inner and outer portions. A seal on each side of an assembly prevents lubricating grease from escaping and dirt and moisture from entering the bearing contact region of the assembly. The central annular step 5201 on the axle 4800 maintains separation of the ball bearing races. Once the main pulley 3901 and ball bearing assemblies 5301A and 5301B have been pressed on to the axle 4800, the pulley/bearing/axle assembly is inserted between the opposed left-hand main pulley groove 201L and the right-hand main pulley groove 201R in the left and right side plates 200L and 200R, respectively. A main pulley securing shoulder bolt 3706 is then inserted through the left-hand main pulley bolt aperture 202L in the left side plate 200L, through the cylindrical central aperture 5101 in the main pulley axle 4800, and through the right-hand main pulley bolt aperture 202R in the right side plate 200R. Finally, the main pulley securing shoulder bolt 3706 is secured with a nylon-insert locking nut 3806. It will be noted that the opposed left-hand main pulley groove 201L and the right-hand main pulley groove 201R in the left and right side plates 200L and 200R, respectively, are accessible from the middle top edges 4503L and 4503R of the side plates 102 and 201, respectively.

Referring now to FIG. 54, this cross-sectional view shows the rear auxiliary pulley 2800R installed on the rear stainless steel bushing 3400R, which has been slipped into opposing left- and right-hand rear auxiliary pulley groove 205L and 205R, respectively, and secured in position through front auxiliary pulley bolt apertures 206L and 206R with a rear auxiliary pulley shoulder bolt 3705R and a nylon-insert locking nut 3805R. Brass thrust washers 3100 are positioned on the stainless steel bushing 3400R on either side of the rear auxiliary pulley 2800R.

Figures 55, 56:
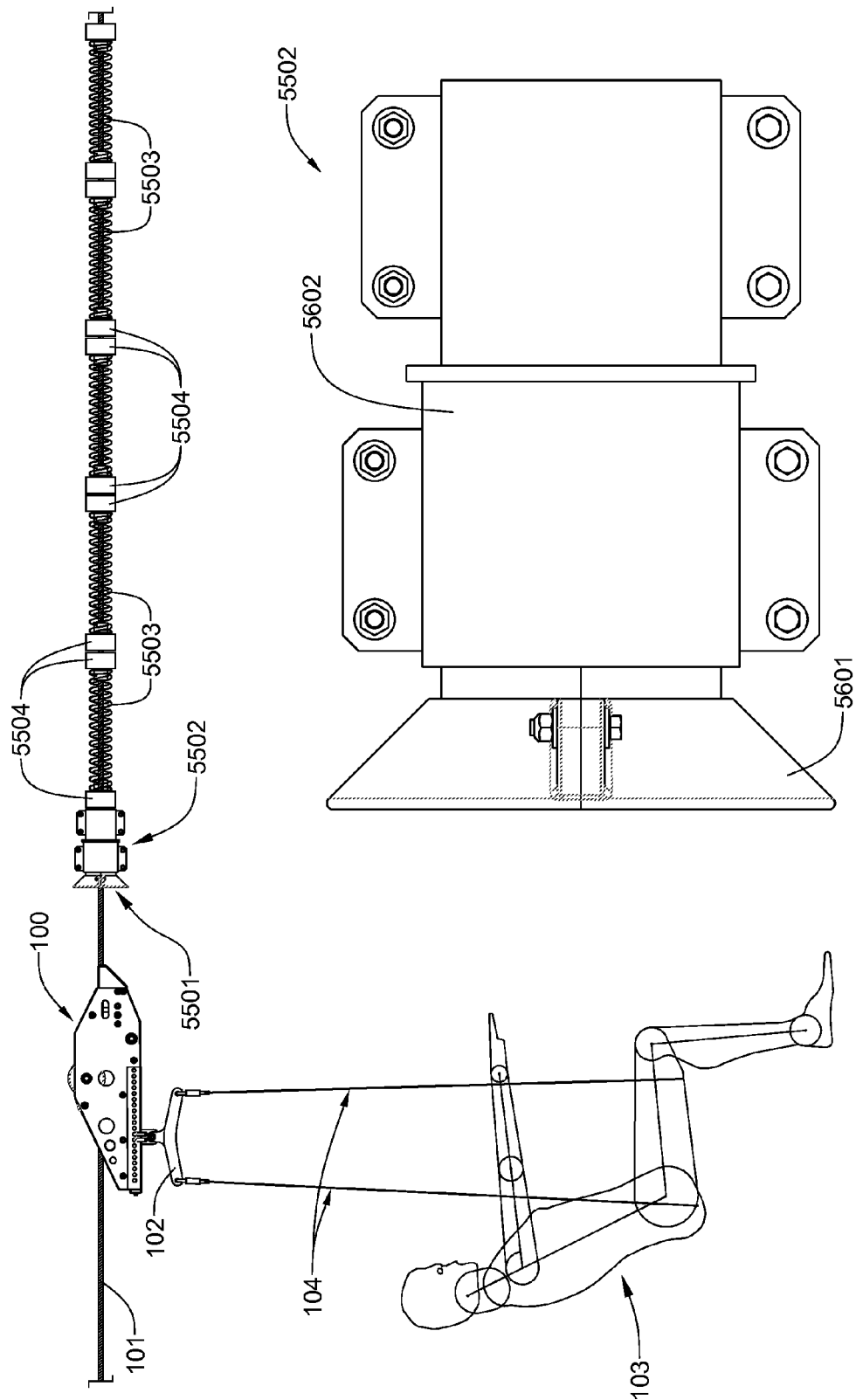
FIG. 55 is a side elevational view of a trolley, a suspended rider, a conical trap and weighted coil spring assemblies installed on the suspended cable near a lower end thereof.
FIG. 56 is an enlarged side elevational view of the conical trap.
Figure 57:
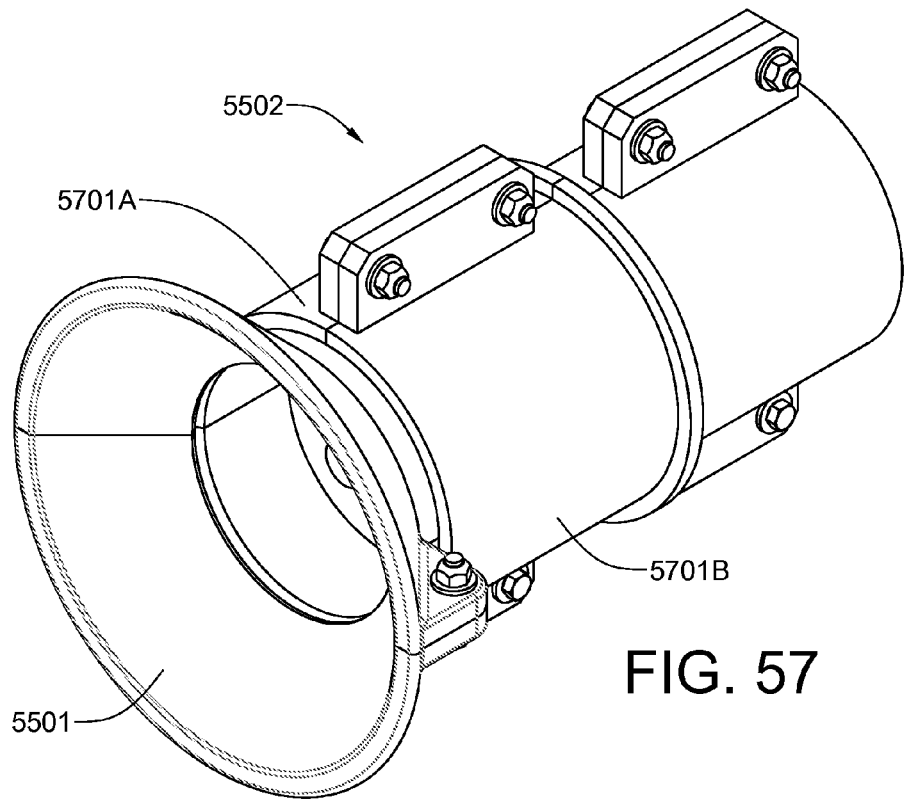
FIG. 57 is an enlarged front-top-right side isometric view of the conical trap.
Figure 58:
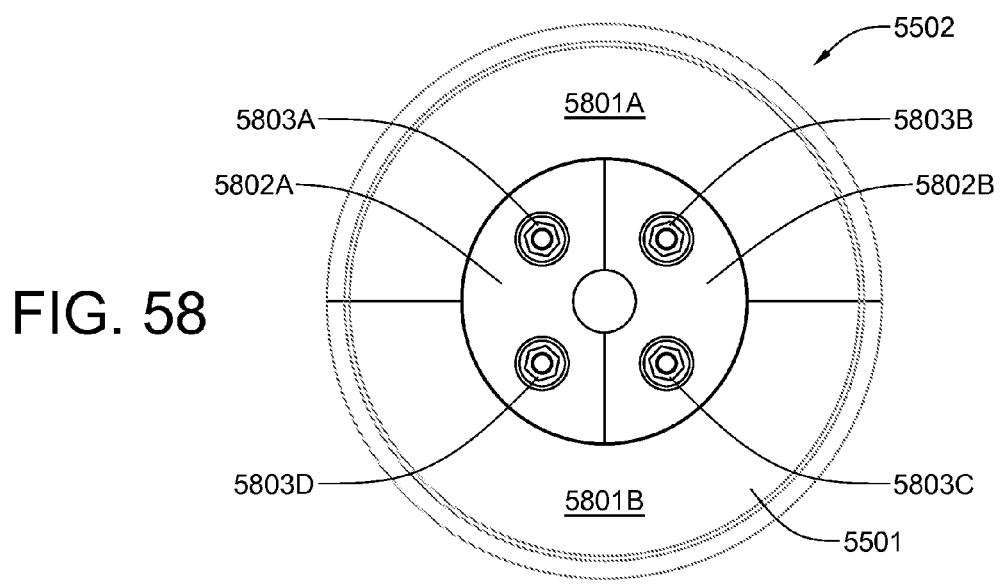
FIG. 58 is an enlarged front elevational view of the conical trap.
Figure 59:
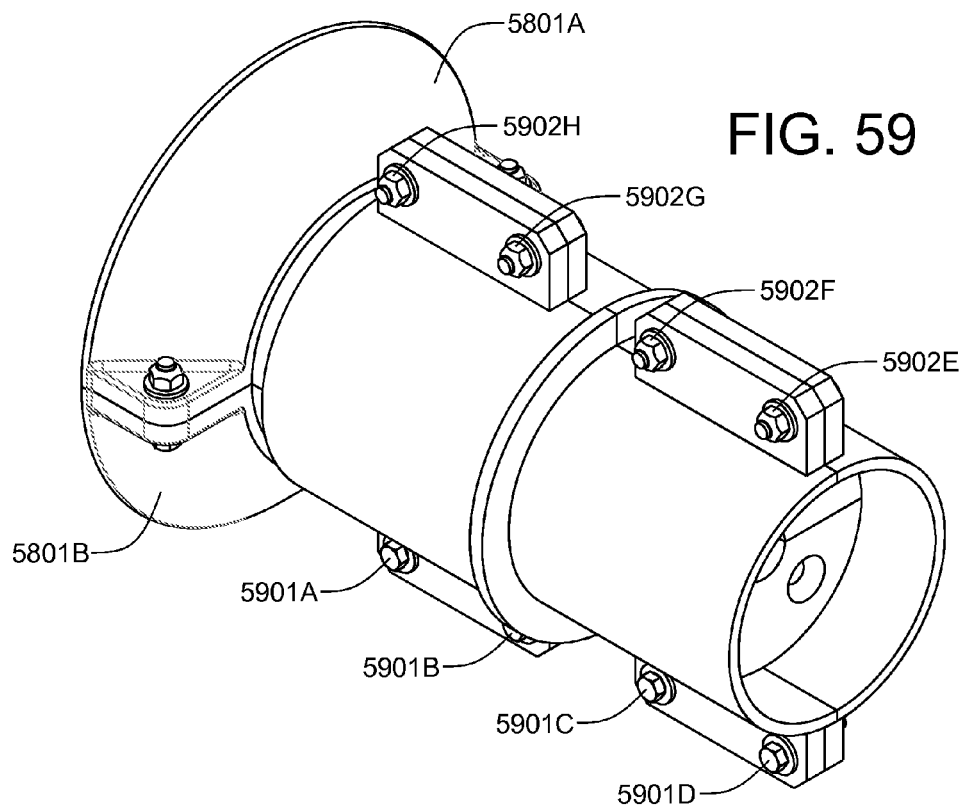
FIG. 59 is an enlarged rear-top-right side isometric view of the conical trap.
Figure 60:
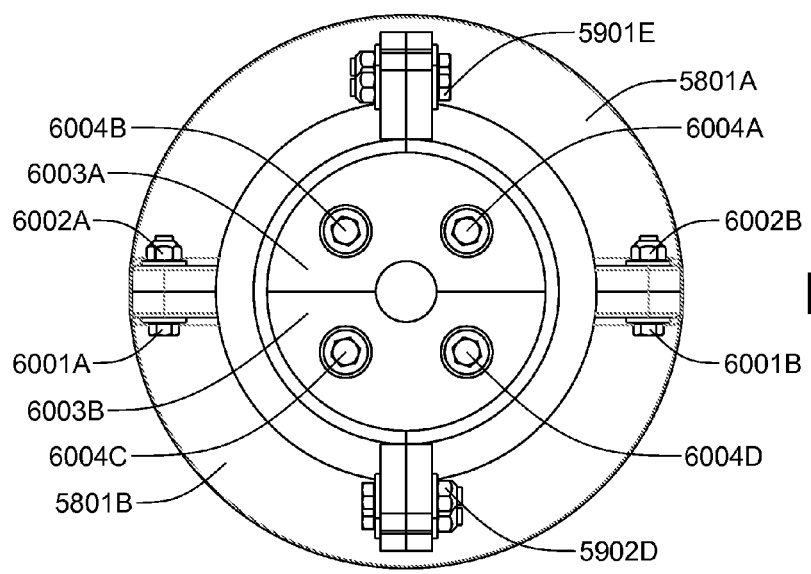
FIG. 60 is an enlarged rear elevational view of the conical trap.
Figure 61:
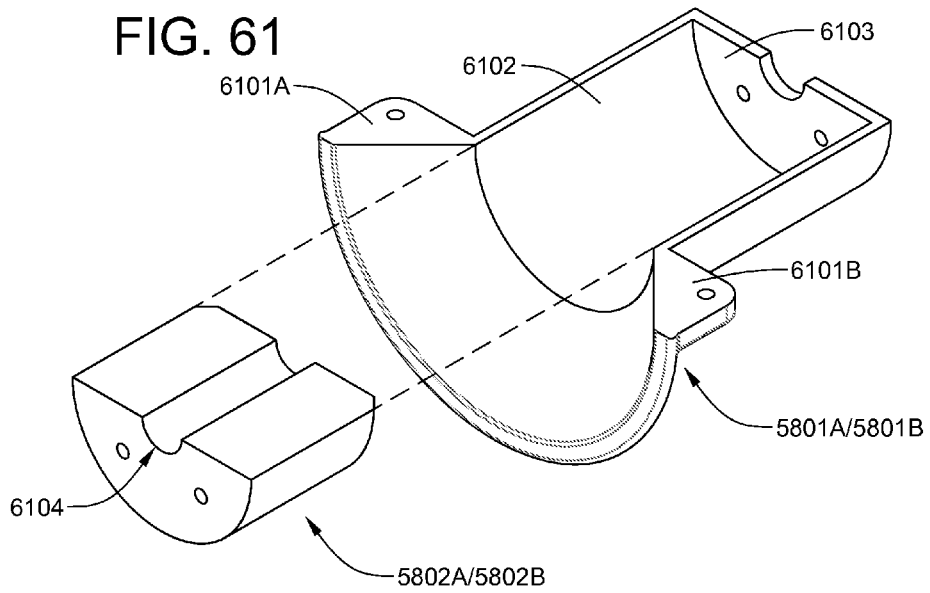
FIG. 61 is an exploded view of one-half of the conical bell member and one-half of the front bushing.
Figure 62:
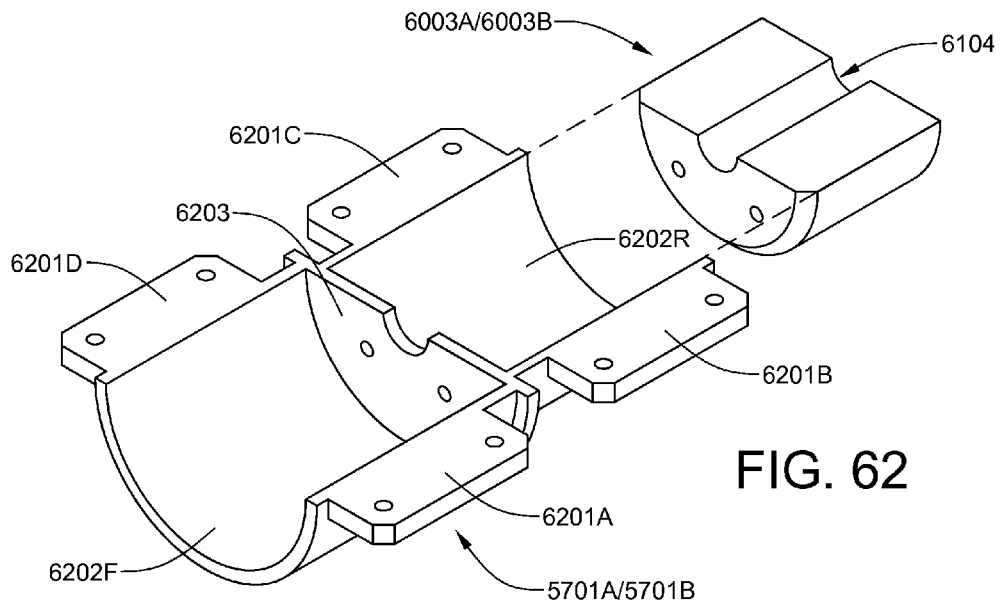
FIG. 62 is an exploded view of one-half of the longitudinal body member and one-half of the rear bushing.

Referring now to FIG. 55, at the end of the thrill ride, the bumper 1100 at the front of the trolley 100 engages the conical receiver 5501 of a trap 5502 that is slidably mounted on the suspended cable 101. The use of a conical receiver 5501 ensures that the bumper will engage the trap 5502 without fail. As the bumper 1100 engages the conical receiver 5501, the bumper 1100 is forced upward by the upwardly-sloping interior surface of the conical receiver, thereby increasing the pressure of the brake pad 2100 against the suspended cable 101. The momentum of the trolley 100 and rider 103 drives the trap 5502 into one or more unloaded coil springs 5503 that are concentrically installed on weighted bushings 5504 on the suspended cable 101, simultaneously accelerating the weighted bushings 5504 and compressing the coil springs 5503. These features ensure that even if the pressure of the brake pad 2100 against the suspended cable 104 is not properly adjusted before the ride begins, the rider 103 will stop safely before reaching the end of the suspended cable 101.

Referring now to FIGS. 56 through 62, the conical trap 5502 has an axially-split conical bell member 5601 that is comprised of identical first and second half bell member portions 5801A and 5801B, respectively. Each half bell member portion 5801A or 5801B has a pair of triangular ears 6101A and 6101B, which enable the first and second half bell member portions 5801A and 5801B to be bolted together with bolt/self-locking nylon-insert nut pairs 6001A/6002A and 6001B/6002B. When assembled, the conical bell member 5601 has a cylindrical chamber comprised of adjacent semi-cylindrical chambers 6102. In addition, the conical trap 5502 has an axially-split longitudinal body member 5602 that comprises identical first and second body member portions 5701A and 5701B. Each of the first and second body longitudinal member portions 5701A and 5701B has four ears 6201A, 6201B, 6201C and 6201D which are bolted together with bolts 5901A, 5901B, 5901C, 5901D, 5901E, 5901F, 5901G and 5901H and self-locking nylon insert nuts 5902A, 5902B, 5902C, 5902D, 5902E, 5902F, 5902G and 5902H. When both halves are assembled, the longitudinal body member 5602 has a front cylindrical chamber comprised of adjacent semi-cylindrical chambers 6202F and a rear cylindrical chamber comprised of adjacent semi-cylindrical chambers 6202R, which are separated by a pair of abutting semi-circular bulkheads 6203. The conical bell member 5601, when assembled, slides into the front cylindrical chamber. A pair of axially-split bushings comprised of identical halves 5802A/5802B and 6003A/6003B are inserted within the cylindrical chamber of the conical bell member 5601 and the rear cylindrical chamber of the longitudinal body member 5602, respectively. The axially-split bushings 5802A/5802B and 6003A/6003B, the conical bell member 5601 and the longitudinal body member 5602 are then bolted together as a unit with allen-head bolts 6004A, 6004B, 6004C and 6004D and self-locking nylon insert nuts 5803A, 5803B, 5803C, and 5803D. It should be obvious that the conical bell member 5601, the longitudinal body member 5602 and the bushings are split so that they can be assembled as a unit on the suspended cable 101, as shown in FIG. 55.

Although only a single embodiment of a trolley for a downhill zip line thrill ride has been heretofore described, it will be obvious to those having ordinary skill in the art that changes and modifications may be made thereto without departing from the scope and the spirit of the invention as hereinafter claimed.

What is claimed is:

1. A zip line trolley comprising:
   right and left parallel, spaced-apart, vertically-oriented side plates;
   an inner beam at least partially sandwiched between lower portions of said side plates, said inner beam and said side plates being bolted together with bolts passing transversely through said side plates, said inner beam having a gallery of generally T-shaped cross section open at the bottom thereof that extends from about a longitudinal mid position of the trolley to about a rear end thereof;
   a main pulley rotatably secured between said side plates at about the longitudinal mid position of the trolley, said main pulley sized to fit over a suspended zip line cable so that said main pulley supports the trolley and a rider;
   a brake pad pivotally secured by a bolt and a nut between the side plates forward of said main pulley, said bolt passing through one side plate, through said brake pad, and through the other side plate, and into said nut, said brake pad having a generally upward-facing cable contact surface;
   a bumper partially sandwiched between front portions of said side plates and bolted therebetween, said bumper functioning as a rigidifying spacer between said side plates, said bumper serving to protect said side plates from mechanical damage, and said bumper having an upwardly-angled lower-front face; and
   a shackle for supporting a suspended rider slidably installed within said gallery, said shackle being securable within said gallery at different locations therein to variably adjust a force of the brake pad against an under side of a cable on which the trolley is suspended.

2. The zip line trolley of claim 1, wherein said shackle is caged within said gallery so that it cannot slide out without at least some disassembly of the trolley.

3. The zip line trolley of claim 1, which further comprises first and second auxiliary pulleys, said first auxiliary pulley being rotatably secured between the side plates above the brake pad, said second auxiliary pulley being rotatably secured behind the main pulley and providing failsafe support of the trolley over the suspended zip line cable in the unlikely event of catastrophic failure of the main pulley.

4. The zip line trolley of claim 1, wherein said inner beam is provided with a plurality of evenly-spaced apertures, which extend transversely through an upper portion of the gallery.

5. The zip line trolley of claim 4, wherein said shackle is equipped with at least one transverse aperture which aligns with any of the transverse apertures which extend through the gallery, thereby enabling the shackle to be secured within the gallery at incremental positions along the length thereof with a pull pin passing through a transverse aperture in the gallery and through said at least one transverse aperture in said shackle.

6. The zip line trolley of claim 1, wherein said main pulley rotates on sealed ball bearing races that are pressed onto a keyed shaft, said keyed shaft sliding into opposed grooves machined into each of the side plates.

7. The zip line trolley of claim 4, which further comprises a retrieval line anchor device secured to a rear end of the trolley, said anchor device being positioned such that when a force is applied in a direction that is generally parallel to the suspended zip line cable and in a direction toward an elevated starting point, the trolley rotates around the main pulley so as to release contact of the brake pad with a lower surface of the zip line cable.

8. In combination with the trolley of claim 1, a trap slidably mounted on the suspended cable immediately adjacent at least one unloaded coil spring that is concentrically installed on weighted bushings slidable on the suspended cable, said trap having a receiver with a conical inner surface, said receiver capturing the trolley bumper at the end of each ride, thereby causing an anterior portion of the trolley to be forced upward by the bumper sliding upward on the interior conical surface, resulting in increased pressure of the brake pad against the suspended cable, with momentum of the trolley and rider driving the trap into said at least one unloaded coil springs and weighted bushings, thereby simultaneously accelerating the weighted bushings and compressing said at least one coil spring.

9. A trolley for use on an inclined cable suspended between two immovable objects, the trolley comprising:
   a frame having an inner beam at least partially sandwiched and bolted between right and left side plates, said inner beam having an internal gallery that extends from about a longitudinal midpoint of the trolley to the rear thereof, said gallery having an open bottom slot along its entire length;
   a main pulley rotatably secured between said side plates at about the longitudinal mid position of the trolley, said main pulley sized to fit over the inclined cable so that said main pulley supports the trolley and a rider;
   a brake pad pivotally secured by a bolt and a nut between the side plates forward of said main pulley, said bolt passing through one side plate, through said brake pad, and through the other side plate, and into said nut, said brake pad having a generally upward-facing cable contact surface; and
   a shackle caged within the gallery, yet slidable an entire length thereof, said shackle protruding through the slot and providing a suspension point for a rider and being securable at different locations within the gallery to a force of the brake pad applied against a lower surface of the inclined cable.

10. The trolley of claim 9, which further comprises first and second auxiliary pulleys, said first auxiliary pulley being rotatably secured between the side plates above the brake pad, and said second auxiliary pulley being rotatably secured behind the main pulley and providing failsafe support of the trolley over the inclined cable in the unlikely event of catastrophic failure of the main pulley.

11. The trolley of claim 9, wherein said inner beam is provided with a plurality of evenly-spaced apertures, which extend transversely through an upper portion of the gallery, and said shackle is equipped with at least one transverse aperture which aligns with any of the transverse apertures extending through the gallery, thereby enabling the shackle to be secured within the gallery at incremental positions along the length thereof with a pull pin passing through a transverse aperture in the gallery and through said at least one transverse aperture in said shackle.

12. The trolley of claim 9, wherein said main pulley rotates on sealed ball bearing races that are pressed onto a keyed shaft, said keyed shaft sliding into opposed grooves machined into each of the side plates.

13. The trolley of claim 10, which further comprises a retrieval line anchor device secured to a rear end of the trolley, said anchor device being positioned such that when a force is applied in a direction that is generally parallel to the suspended zip line cable and in a direction toward an elevated starting point, the trolley rotates around the main pulley so as to release contact of the brake pad with a lower surface of the zip line cable, said first auxiliary pulley limiting rotation of the trolley about said main pulley.

14. The trolley of claim 10, which further comprises:
an end plate secured to a rear portion of said inner beam, thereby blocking a rear opening to said gallery and thereby caging said shackle; and
an eye bolt rotatably secured within a central aperture within said end plate, said eye bolt functioning as the retrieval line anchor device.

15. The trolley of claim 9, wherein said brake pad is equipped with at least one transverse slot on the cable contact surface, said at least one transverse slot assisting in the wiping of water from a surface of the suspended cable.

16. A trolley for use on an inclined cable suspended between two immovable objects, the trolley comprising:
a frame;
a main pulley rotatably mounted within a central upper portion of said frame, said main pulley intended to ride on top of the inclined cable;
a brake pad pivotally mounted within a forward portion of said frame, said brake pad having a generally upward-facing cable contact surface;
a longitudinal gallery located within a lower rear portion of said frame, said having an open bottom slot along a major portion of its length;
a shackle caged within the gallery, yet slidable an entire length thereof, said shackle protruding through the bottom slot and providing a suspension point for a rider and being securable at different locations within the gallery to a force of the brake pad applied against a lower surface of the inclined cable.

17. The trolley of claim 16, wherein said inner beam is provided with a plurality of evenly-spaced apertures which extend transversely through an upper portion of the gallery, and said shackle is equipped with at least one transverse aperture which aligns with any of the transverse apertures extending through the gallery, thereby enabling the shackle to be secured within the gallery at incremental positions along the length thereof with a pull pin passing through a transverse aperture in the gallery and through said at least one transverse aperture in said shackle.

18. The trolley of claim 16, which further comprises first and second auxiliary pulleys, said first auxiliary pulley being rotatably secured between the side plates above the brake pad, and said second auxiliary pulley being rotatably secured behind the main pulley and providing failsafe support of the trolley over the inclined cable in the unlikely event of catastrophic failure of the main pulley.

19. The trolley of claim 16, which further comprises a retrieval line anchor device secured to a rear end of the trolley, said anchor device being positioned such that when a force is applied in a direction that is generally parallel to the suspended zip line cable and in a direction toward an elevated starting point, the trolley rotates around the main pulley so as to release contact of the brake pad with a lower surface of the zip line cable, said first auxiliary pulley limiting rotation of the trolley about said main pulley.

20. The trolley of claim 16, wherein said main pulley rotates on sealed ball bearing races that are pressed onto a keyed shaft, said keyed shaft sliding into opposed grooves machined in said frame.

* * * * *